United States Patent
Heddy, III et al.

(10) Patent No.: US 11,408,331 B2
(45) Date of Patent: Aug. 9, 2022

(54) WASTEGATE ASSEMBLY AND TURBOCHARGER INCLUDING THE SAME

(71) Applicant: BorgWarner Inc., Auburn Hills, MI (US)

(72) Inventors: George Edward Heddy, III, Hendersonville, NC (US); Dominic William DePaoli, Horse Shoe, NC (US)

(73) Assignee: BorgWarner Inc., Auburn Hills, MI (US)

( * ) Notice: Subject to any disclaimer, the term of this patent is extended or adjusted under 35 U.S.C. 154(b) by 8 days.

(21) Appl. No.: 16/811,609

(22) Filed: Mar. 6, 2020

(65) Prior Publication Data

US 2021/0277821 A1 Sep. 9, 2021

(51) Int. Cl.
*F02B 37/18* (2006.01)
*F04D 27/00* (2006.01)

(52) U.S. Cl.
CPC .......... *F02B 37/183* (2013.01); *F04D 27/009* (2013.01); *F05D 2220/40* (2013.01); *F05D 2260/606* (2013.01)

(58) Field of Classification Search
CPC ...... F02B 37/18; F02B 37/183; F02B 37/186; F01D 17/105; F04D 27/009; F05D 2220/40; F05D 2260/606; F16K 1/18–2092
See application file for complete search history.

(56) References Cited

U.S. PATENT DOCUMENTS

| | | | |
|---|---|---|---|
| 4,617,799 A | 10/1986 | Todokoro et al. | |
| 4,730,456 A * | 3/1988 | Tadokoro | F01D 17/18 60/602 |
| 5,046,317 A | 9/1991 | Satokawa | |
| 8,096,754 B2 | 1/2012 | Naemura et al. | |
| 8,336,309 B2 | 12/2012 | McEwan et al. | |

(Continued)

FOREIGN PATENT DOCUMENTS

| | | |
|---|---|---|
| DE | 102013214665 A1 | 1/2015 |
| GB | 2038940 A | 7/1980 |
| JP | H11044219 A | 2/1999 |

OTHER PUBLICATIONS

Machine-Assisted English language abstract and Machine-Assisted English language translation for DE 10 2013 214 665 extracted from espacenet.com database on May 13, 2020, 8 pages.

(Continued)

*Primary Examiner* — Loren C Edwards
(74) *Attorney, Agent, or Firm* — Howard & Howard Attorneys PLLC

(57) ABSTRACT

A wastegate assembly for a turbocharger includes a valve element. The valve element has a valve body, a first shaft extending away from the valve body along a first axis, and a second valve shaft spaced from the first valve shaft and extending away from the valve body along a second axis. The valve element is movable between a first and a second position to control exhaust gas flow to a turbine housing interior of the turbocharger. The wastegate assembly also includes a valve arm coupled to the first and second valve shafts for moving the valve element between the first and second positions. The wastegate assembly further includes a washer coupled to at least one of the first and second valve shafts and axially spaced from the valve arm with respect to the first and second axes.

20 Claims, 16 Drawing Sheets

(56) References Cited

U.S. PATENT DOCUMENTS

| | | | |
|---|---|---|---|
| 9,869,238 B2 | 1/2018 | Stilgenbauer et al. | |
| 2009/0028694 A1* | 1/2009 | Naemura | F02B 37/18 |
| | | | 415/145 |
| 2009/0151352 A1* | 6/2009 | McEwan | F02B 37/183 |
| | | | 60/602 |
| 2012/0055154 A1 | 3/2012 | Ebert | |
| 2014/0366530 A1* | 12/2014 | Murayama | F02B 37/183 |
| | | | 60/602 |
| 2016/0348574 A1* | 12/2016 | Goeckelmann | F16K 51/00 |

OTHER PUBLICATIONS

English language abstract and Machine-Assisted English language translation for JPH 11-44219 extracted from espacenet.com database on May 13, 2020, 8 pages.

* cited by examiner

FIG. 5
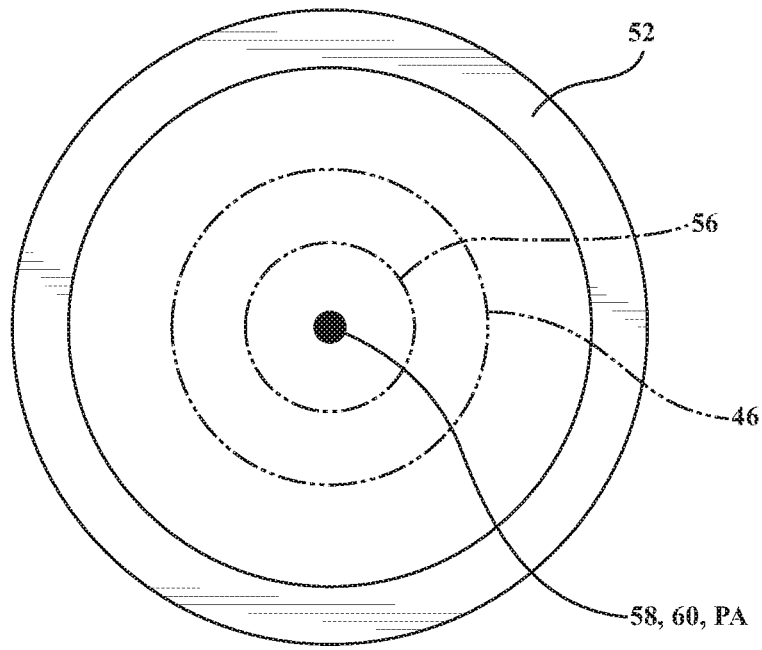
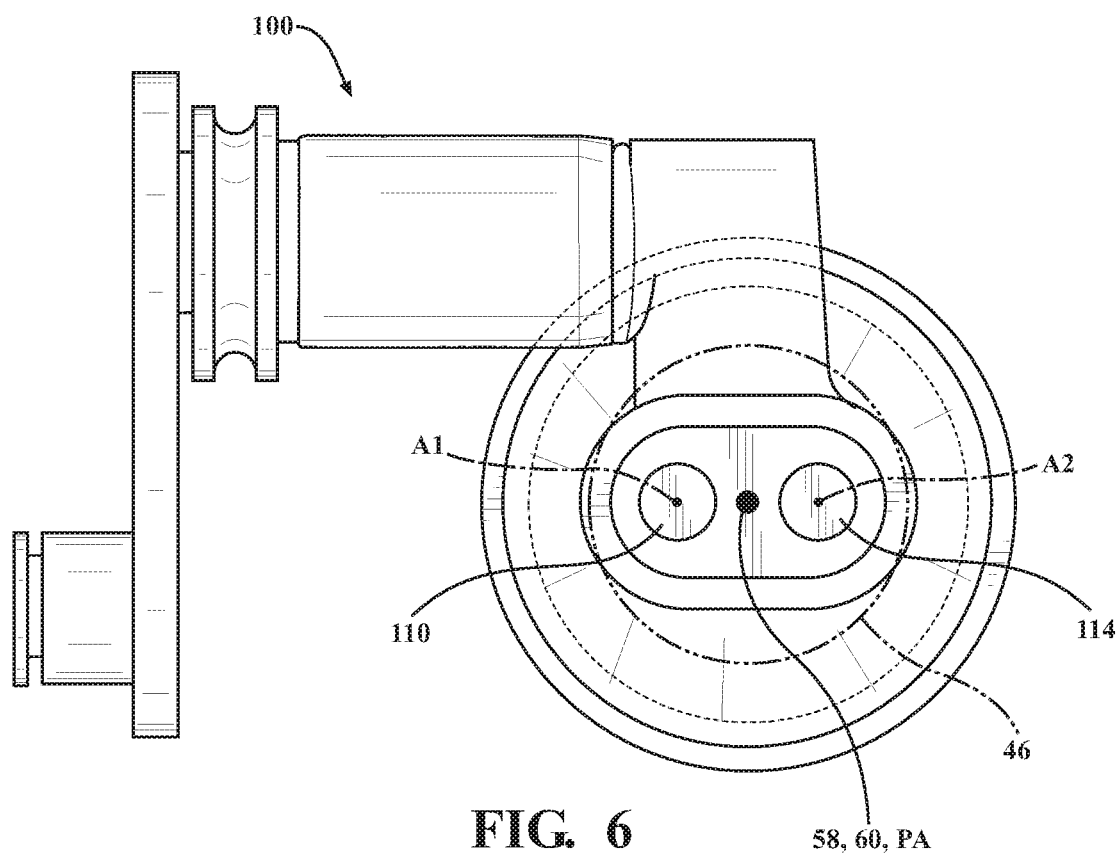
FIG. 6

WASTEGATE ASSEMBLY AND TURBOCHARGER INCLUDING THE SAME

BACKGROUND OF THE INVENTION

1. Field of the Invention

The present invention generally relates to a wastegate assembly for controlling exhaust gas flow to a turbine housing interior of a turbocharger, and to a turbocharger including the wastegate assembly.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use in a vehicle reduces the mass and aerodynamic frontal area of the vehicle, which helps reduce fuel consumption of the internal combustion engine and improve fuel economy of the vehicle. Additionally, a smaller internal combustion engine that is turbocharged changes the brake specific fuel consumption (BSFC) versus power curve, which ultimately reduces fuel consumption at lower power settings where most real-world driving conditions take place. This results in the internal combustion engine being more thermally efficient.

Conventional turbochargers include a turbine housing. The turbine housing has an interior surface defining a turbine housing interior. The interior surface extends between a turbine housing inlet and a turbine housing outlet. Conventional turbine housings also include a wastegate duct disposed downstream of the turbine housing inlet that defines a wastegate channel in fluid communication with the turbine housing inlet for discharging exhaust gas from the turbine housing inlet by bypassing the turbine housing interior.

Conventional turbochargers also include a valve seat disposed about the wastegate channel at a channel outlet of the wastegate channel, and a wastegate assembly for controlling exhaust gas flow to the turbine housing interior. The wastegate assembly includes a valve element engageable with the valve seat. The valve element includes a valve body and a valve shaft extending away from the valve body. The wastegate assembly also includes a valve arm coupled to the valve shaft for moving the valve element between a first position (e.g., closed position) and a second position (e.g., open position). In the first position, the valve element is engaged with the valve seat. In the second position the valve element is disengaged from the valve seat. The wastegate assembly further includes a washer coupled to the valve shaft for retaining the valve arm to the valve shaft.

During operation of the turbocharger, exhaust gas flows through the wastegate channel and exerts a force on the valve body of the valve element, particularly when the valve element is in the first position. Over time, force exerted by exhaust gas on the valve body causes wear of the valve shaft and the washer coupled to the valve shaft, thereby decreasing the efficiency of the turbocharger and ultimately leading to failure of the wastegate assembly. Furthermore, force exerted by exhaust gas on the valve body causes vibration of the various components of the wastegate assembly, thereby producing undesirable noise during operation of the turbocharger, particularly when the turbocharger is used in automotive vehicle applications.

As such, there remains a need to provide an improved wastegate assembly for a turbocharger.

SUMMARY OF THE INVENTION AND ADVANTAGES

A turbocharger delivers compressed air to an internal combustion engine and receives exhaust gas from the internal combustion engine. In one embodiment, the turbocharger includes a turbine housing. The turbine housing includes an interior surface defining a turbine housing interior. The interior surface extends between a turbine housing inlet and a turbine housing outlet. The turbine housing inlet is defined at one end of the interior surface and is in fluid communication with the internal combustion engine and the turbine housing interior for delivering exhaust gas from the internal combustion engine to the turbine housing interior. The turbine housing outlet is defined at an opposite end of the interior surface and is in fluid communication with the turbine housing interior for discharging exhaust gas from the turbine housing interior. The turbine housing also includes a wastegate duct disposed downstream of the turbine housing inlet and defining a wastegate channel in fluid communication with the turbine housing inlet for discharging exhaust gas from the turbine housing inlet by bypassing the turbine housing interior. The turbocharger further includes a valve seat disposed about the wastegate channel at a channel outlet of the wastegate channel. The turbocharger also further includes a wastegate assembly that controls exhaust gas flow to the turbine housing interior. The wastegate assembly includes a valve element engageable with the valve seat. The valve element has a valve body, a first valve shaft extending away from the valve body along a first axis, and a second valve shaft spaced from the first valve shaft and extending away from the valve body along a second axis. The valve element is moveable between a first position and a second position. In the first position, the valve body is engaged with the valve seat for preventing exhaust gas flow from the turbine housing inlet from bypassing the turbine housing interior. In the second position, the valve body is disengaged with the valve seat for allowing exhaust gas flow from the turbine housing inlet to bypass the turbine housing interior. The wastegate assembly also includes a valve arm coupled to the first and second valve shafts of the valve element for moving the valve element between the first and second positions. The wastegate assembly further includes a washer coupled to at least one of the first and second shafts of the valve element and axially spaced from the valve arm with respect to the first and second axes for retaining the valve arm to the at least one of the first and second valve shafts. The wastegate assembly may further include a biasing member disposed about at least one of the first and second valve shafts between the valve arm and the washer for reducing wear of the washer.

Accordingly, the wastegate assembly including the first and second valve shafts of the valve element results in force exerted by exhaust gas on the valve body being distributed over each of the first and second valve shafts, thereby reducing wear of the first and second valve shafts and the washer, increasing the efficiency of the turbocharger, and increasing lifetime of the turbocharger. Moreover, the biasing member of the wastegate assembly further reduces wear of the at least one washer and also reduces vibrations of the various components of the turbocharger, thereby improving the NVH (noise, vibration, and harshness) characteristics of the turbocharger, particularly when the turbocharger is used in automotive vehicle applications.

In another embodiment, the turbocharger includes a turbine housing. The turbine housing includes an interior surface defining a turbine housing interior. The interior surface extends between a turbine housing inlet and a turbine housing outlet. The turbine housing inlet is defined at one end of the interior surface and is in fluid communication with the internal combustion engine and the turbine housing interior for delivering exhaust gas from the internal combustion engine to the turbine housing interior. The turbine housing outlet is defined at an opposite end of the interior surface and is in fluid communication with the turbine housing interior for discharging exhaust gas from the turbine housing interior. The turbine housing also includes a wastegate duct disposed downstream of the turbine housing inlet and defining a wastegate channel in fluid communication with the turbine housing inlet for discharging exhaust gas from the turbine housing inlet by bypassing the turbine housing interior. The turbocharger further includes a valve seat disposed about the wastegate channel at a channel outlet of the wastegate channel. The valve seat has a geometrical configuration having a plane extending across the channel outlet, with the plane having a geometric centroid and a pulse region. The pulse region has a pulse centroid and a pulse axis extending perpendicular to the plane and through the pulse region. The turbocharger also includes a wastegate assembly for controlling exhaust gas flow to said turbine housing interior. The wastegate assembly includes a valve element engageable with the valve seat. The valve element has a valve body, a first valve shaft extending away from the valve body along a first axis, and a second valve shaft spaced from the first valve shaft and extending away from the valve body along a second axis. The valve element is moveable between a first position where the valve body is engaged with the valve seat for preventing exhaust gas flow from the turbine housing inlet from bypassing the turbine housing interior, and a second position where the valve body is disengaged with the valve seat for allowing exhaust gas flow from the turbine housing inlet to bypass the turbine housing interior. The wastegate assembly further includes a valve arm coupled to the first and second valve shafts of the valve element for moving the valve element between the first and second positions. The wastegate assembly additionally includes a washer coupled to at least one of the first and second valve shafts of the valve element and axially spaced from the valve arm with respect to the first and second axes for retaining the valve arm to the at least one of the first and second valve shafts. The pulse axis is disposed between the first axis of the first valve shaft and the second axis of the second valve shaft with respect to the plane when the valve element is in the first position such that a pulse force from the exhaust gas at the pulse region is disposed between the first and second valve shafts with respect to the plane during operation of the turbocharger.

Accordingly, having the pulse axis disposed between the first axis of the first valve shaft and the second axis of the second valve shaft with respect to the plane when the valve element is in the first position results in force exerted by exhaust gas on the valve body being distributed over each of the first and second valve shafts, thereby reducing wear of the first and second valve shafts and the washer, increasing the efficiency of the turbocharger, and increasing lifetime of the wastegate assembly and the turbocharger.

In another embodiment, the turbocharger includes a turbine housing. The turbine housing includes an interior surface defining a turbine housing interior. The interior surface extends between a turbine housing inlet and a turbine housing outlet. The turbine housing inlet is defined at one end of the interior surface and is in fluid communication with the internal combustion engine and the turbine housing interior for delivering exhaust gas from the internal combustion engine to the turbine housing interior. The turbine housing outlet is defined at an opposite end of the interior surface and is in fluid communication with the turbine housing interior for discharging exhaust gas from the turbine housing interior. The turbine housing also includes a wastegate duct disposed downstream of the turbine housing inlet and defining a first wastegate channel and a second wastegate channel in fluid communication with the turbine housing inlet for discharging exhaust gas from the turbine housing inlet by bypassing the turbine housing interior. The turbocharger further includes a valve seat disposed about the first and second wastegate channels at a channel outlet of the first and second wastegate channels. The valve seat has a first geometrical configuration having a first plane extending across the channel outlet of the first wastegate channel. The valve seat has a second geometrical configuration having a second plane extending across the channel outlet of the second wastegate channel. The first plane has a first geometrical centroid and a first pulse region. The first pulse region has a first pulse centroid and a first pulse axis extending perpendicular to the first plane and through the first pulse centroid. The second plane has a second geometrical centroid and a second pulse region. The second pulse region has a second pulse centroid and a second pulse axis extending perpendicular to the second plane and through the second pulse centroid. The turbocharger also includes a wastegate assembly for controlling exhaust gas flow to the turbine housing interior. The wastegate assembly include, a valve element engageable with the valve seat. The valve element has a valve body, a first valve shaft extending away from the valve body along a first axis, and a second valve shaft spaced from the first valve shaft and extending away from the valve body along a second axis. The valve element is moveable between a first position where the valve body is engaged with the valve seat for preventing exhaust gas flow from the turbine housing inlet from bypassing the turbine housing interior, and a second position where the valve body is disengaged with the valve seat for allowing exhaust gas flow from the turbine housing inlet to bypass the turbine housing interior. The wastegate assembly further includes a valve arm coupled to the first and second valve shafts of the valve element for moving the valve element between the first and second positions. The wastegate assembly additionally includes a washer coupled to at least one of the first and second valve shafts of the valve element and axially spaced from the valve arm with respect to the first and second axes for retaining the valve arm to the at least one of the first and second valve shafts. The first axis of the first valve shaft extends through the first pulse region when the valve element is in the first position such that the first valve shaft is disposed over the first pulse region, and the second axis of the second valve shaft extends through the second pulse region when the valve element is in the first position such that the second valve shaft is disposed over the second pulse region.

Accordingly, having the first axis of the first valve shaft extending through the first pulse region when the valve element is in the first position and having the second axis of the second valve shaft extending through the second pulse region when the valve element is in the first position results in force exerted by exhaust gas on the valve body being distributed over each of the first and second valve shafts, which reduces a rocking motion of the valve element, thereby reducing wear of the first and second valve shafts and the washer, increasing the efficiency of the turbocharger, and increasing lifetime of the wastegate assembly and the turbocharger.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5 is a top view of the valve seat of FIG. 2 showing a pulse region, a geometrical centroid, and a pulse centroid, with the geometrical centroid and the pulse centroid being aligned with one another;

FIG. 6 is a top view of the wastegate assembly and the valve seat of FIG. 2, with the valve element shown engaged with the valve seat, and with the valve seat shown in phantom;

DETAILED DESCRIPTION OF THE INVENTION

Figure 1:
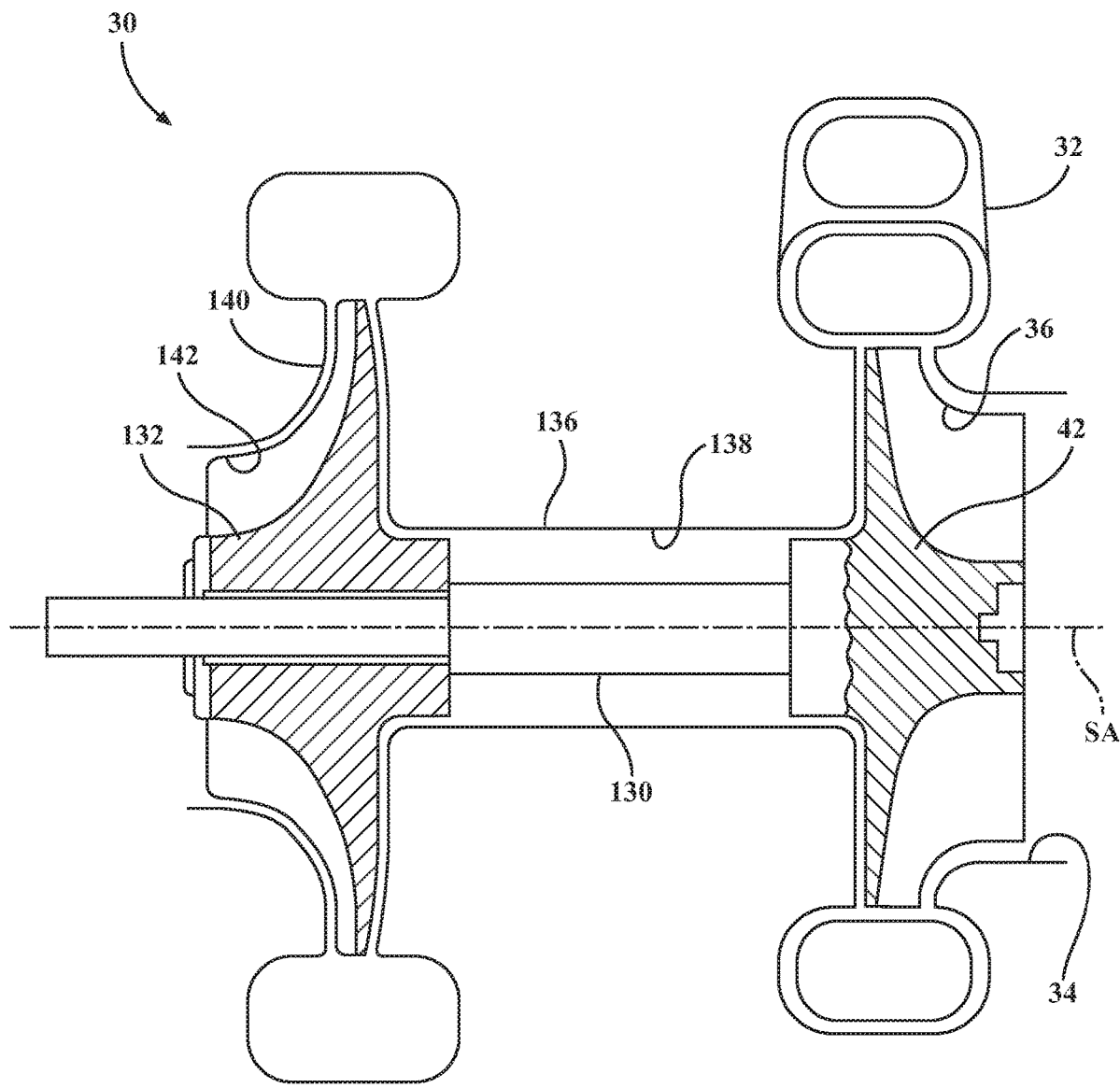
FIG. 1 is a schematic representation of a turbocharger.

With reference to the Figures, wherein like numerals indicate like parts throughout the several views, a schematic representation of a turbocharger 30 for receiving exhaust gas from an internal combustion engine (not shown) and for delivering compressed air to the internal combustion engine is shown in FIG. 1. Although not required, the turbocharger 30 is typically used in automotive vehicle applications, heavy equipment, diesel engines, motors, and the like.

Figure 2:
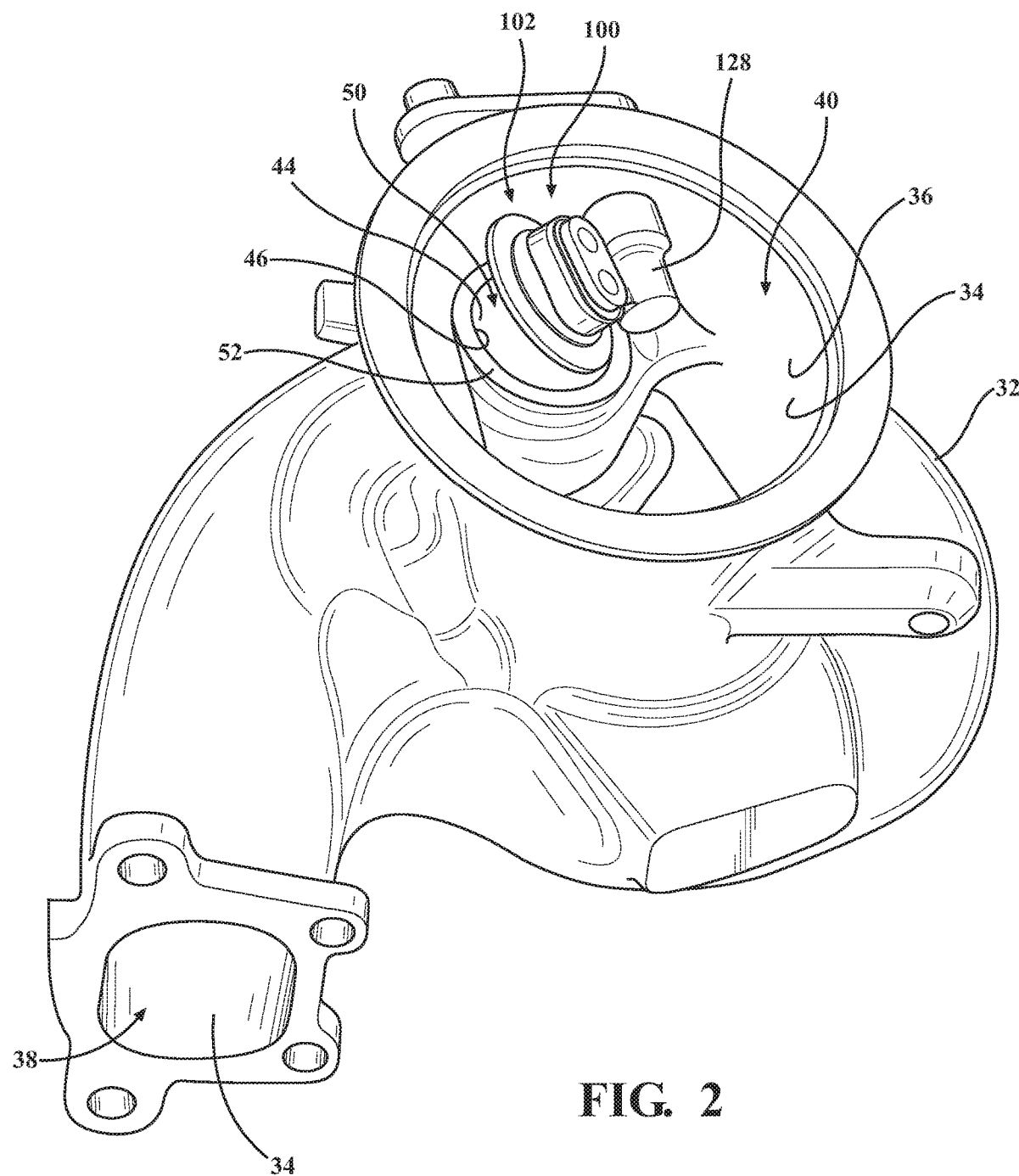
FIG. 2 is an isometric view of a turbine housing, a valve seat, and a wastegate assembly according to one embodiment, with a valve element of the wastegate assembly having a first valve shaft and a second valve shaft, and with the valve element of the wastegate assembly shown disengaged with the valve seat.
Figure 3:
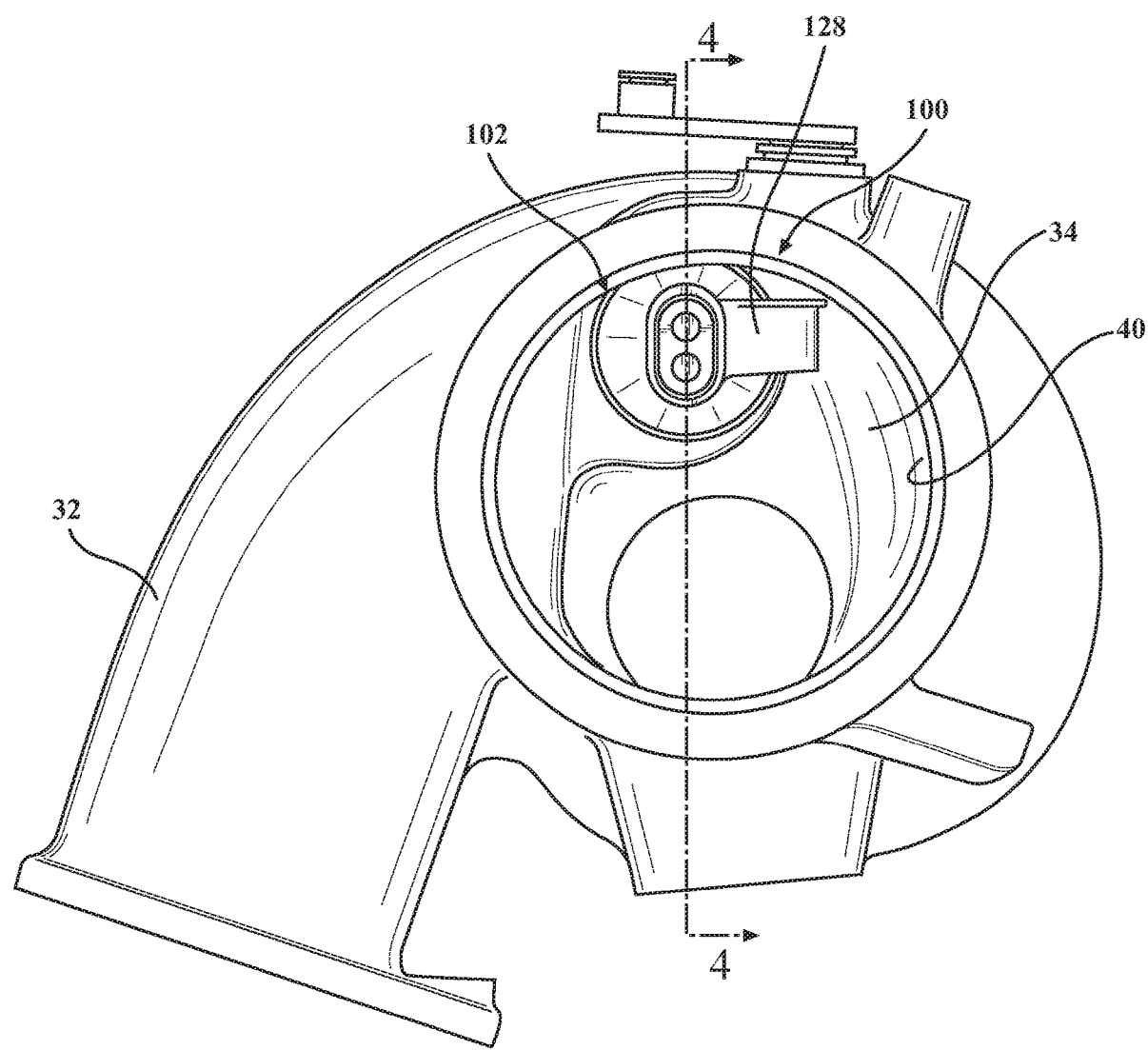
FIG. 3 is a top view of the turbine housing, the valve seat, and the wastegate assembly of FIG. 2, with the valve element of the wastegate assembly shown engaged with the valve seat.

With continued reference to FIG. 1, the turbocharger 30 includes a turbine housing 32. The turbine housing 32 includes an interior surface 34 which defines a turbine housing interior 36. The interior surface 34 extends between a turbine housing inlet 38 and a turbine housing outlet 40, as shown in FIG. 2. The turbine housing inlet 38 is defined at one end of the interior surface 34 and is in fluid communication with the turbine housing interior 36 and the internal combustion engine for delivering exhaust gas from the internal combustion engine to the turbine housing interior 36. Moreover, the turbine housing outlet 40 is defined at an opposite end of the interior surface 34 and is in fluid communication with the turbine housing interior 36 for discharging exhaust gas from the turbine housing interior 36.

As shown in FIG. 1, the turbocharger 30 typically includes a turbine wheel 42 disposed in the turbine housing interior 36. It is to be appreciated that, when the turbine wheel 42 is included in the turbocharger 30, the turbine wheel 42 may be disposed completely inside the turbine housing interior 36 or partially inside the turbine housing interior 36. The turbine wheel 42 receives exhaust gas from the internal combustion engine via the turbine housing inlet 38, causing the turbine wheel 42 to rotate. After rotating the turbine wheel 42, exhaust gas is discharged from the turbine housing interior 36 through the turbine housing outlet 40.

With reference again to FIG. 2, the turbine housing 32 also includes a wastegate duct 44 disposed downstream of the turbine housing inlet 38. The wastegate duct 44 defines a wastegate channel 46 in fluid communication with the turbine housing inlet 38 for discharging exhaust gas from the turbine housing inlet 38 by bypassing the turbine housing interior 36. It is to be appreciated that exhaust gas which flows through the wastegate channel 46 may completely bypass the turbine housing interior 36 such that exhaust gas flows directly from the turbine housing inlet 38 to the turbine housing outlet 40 via the wastegate channel 46. Alternatively, exhaust gas may flow in the turbine housing interior 36 prior to entering the wastegate channel 46 from the turbine housing inlet 38.

Figure 4:
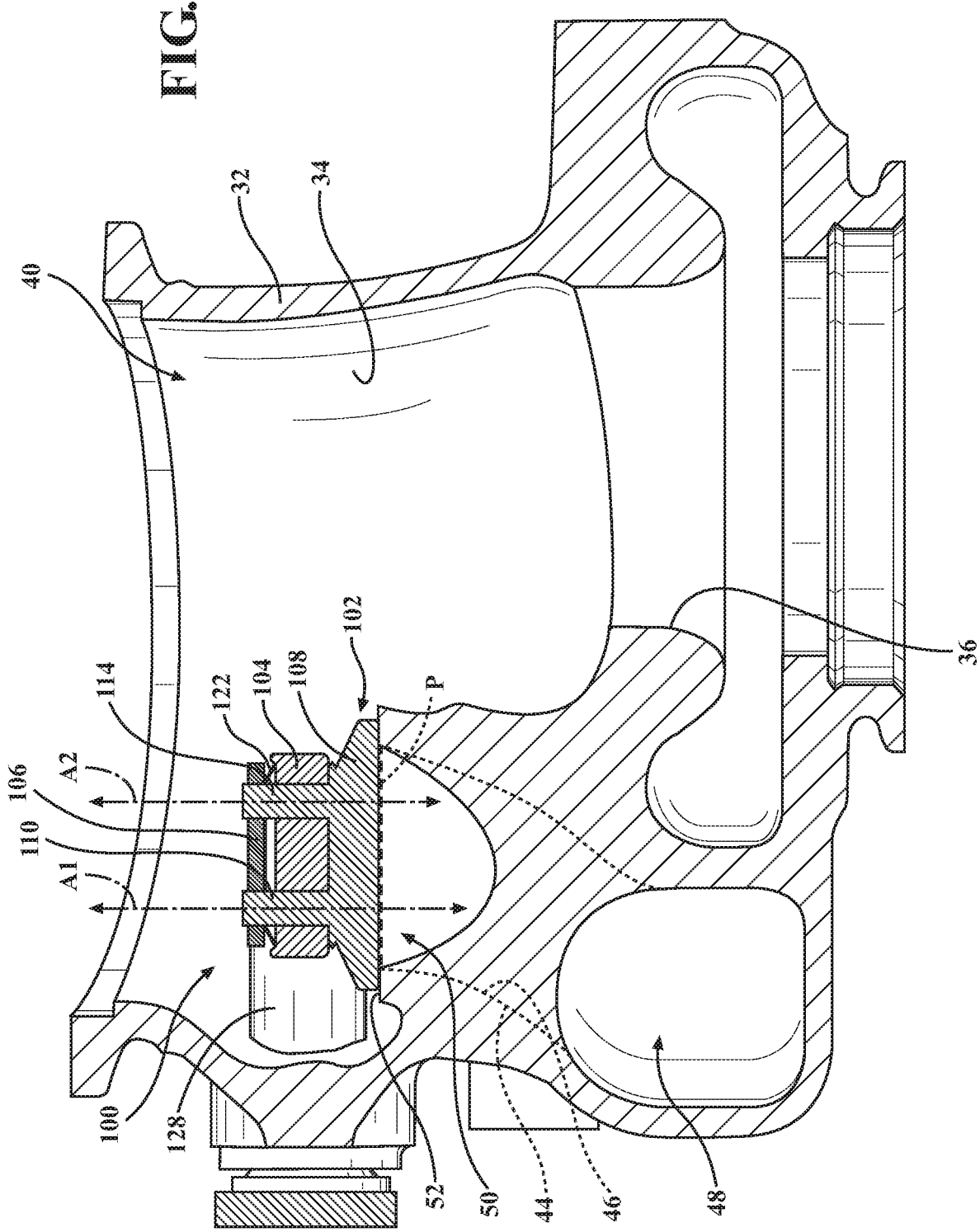
FIG. 4 is a cross-sectional view of the turbine housing, the valve seat, and the wastegate assembly of FIG. 2 taken along line 4-4 in FIG. 3.

With continued reference to FIG. 4, the wastegate channel 46 typically includes a wastegate channel inlet 48 and a wastegate channel outlet 50. In the illustrated embodiment, the wastegate channel inlet 48 is in fluid communication with the turbine housing inlet 38, as shown in FIG. 2, and the wastegate channel outlet 50 is in fluid communication with the turbine housing outlet 40, as shown in FIG. 4. However, it is to be appreciated that the wastegate channel outlet 50 may be in fluid communication with an environment outside of the turbine housing 32 instead of the turbine housing outlet 40. In other words, exhaust gas may flow through the wastegate channel outlet 50 and be discharged to the environment outside of the turbine housing 32 without first flowing through the turbine housing outlet 40.

The internal combustion engine includes a plurality of cylinders. In some embodiments, the internal combustion engine includes four cylinders. However, it is to be appreciated that the internal combustion engine may include any number of cylinders. For example, the internal combustion engine may include two cylinders, four cylinders, six cylinders, eight cylinders, or more cylinders. The internal combustion engine may be a V-engine configuration or an inline engine configuration. The internal combustion engine includes a first group of cylinders and a second group of cylinders. The first and second groups of cylinders each include half of the cylinders present in the internal combustion engine. For example, when the internal combustion engine includes four cylinders, the first group of cylinders includes two of the cylinders and the second group of cylinders includes the other two of the cylinders. The first and second groups of cylinders produce exhaust gas in a series of pulses corresponding to an exhaust stroke of each of the first and second groups of cylinders. Timing of the exhaust stroke of the first group of cylinders is different from timing of the exhaust stroke of the second group of cylinders such that the first and second groups of cylinders alternate pulses of exhaust gas.

In some embodiments, the first and second groups of cylinders are in fluid communication with the turbine housing inlet 38. In other embodiments, when first and second volute inlets 76, 78 of the turbine housing 32 are present, as described below, the first volute inlet 76 is in fluid communication with the first group of cylinders and the second volute inlet 78 is in communication with the second group of cylinders. In this manner, pulses of exhaust gas from the first and second groups of cylinders flow through the first and second volute inlets 76, 78, respectively, and then flow through either the first and second wastegate channels 62, 68 respectively, or the turbine housing interior 36. Accordingly, the turbine housing 32 may be optimized to receive pulses of exhaust gas from the first and second groups of cylinders.

With reference again to FIG. 2, the turbocharger 30 includes a valve seat 52 disposed about the wastegate channel 46 at the wastegate channel outlet 50. Although not required, the valve seat 52 may be integral with the turbine housing 32. Alternatively, the valve seat 52 may be removably coupled to the turbine housing 32.

Figure 7:
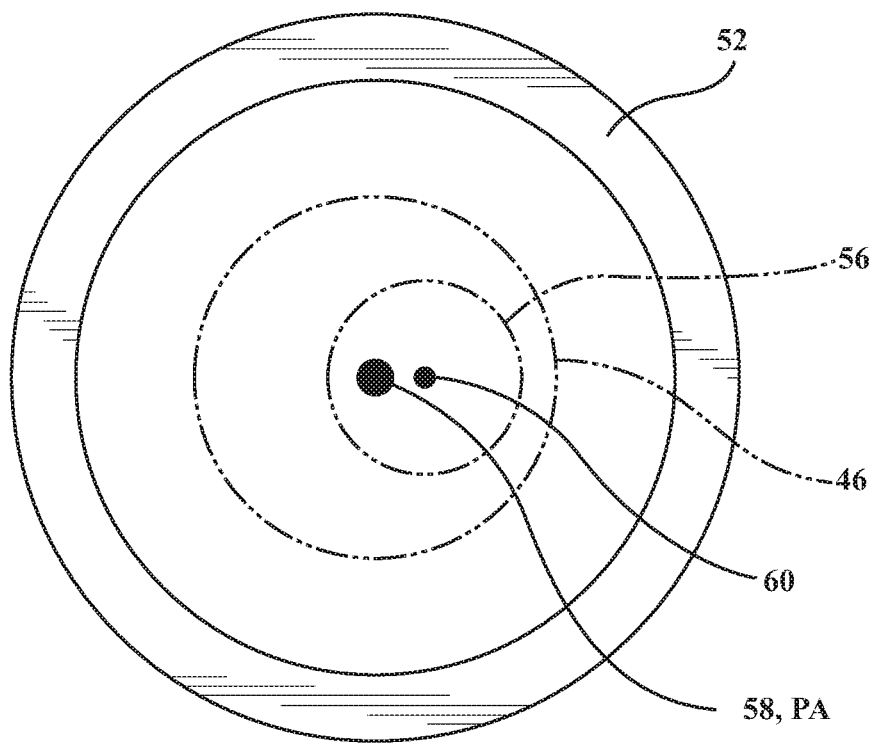
FIG. 7 is a top view of the wastegate assembly and the valve seat of FIG. 2, with the geometrical centroid and the pulse centroid offset from one another.

The valve seat 52 typically defines a geometrical configuration. As shown in FIGS. 3-7, when the turbine housing 32 includes only a single wastegate channel 46, the geometrical configuration defined by the valve seat 52 is typically circular. However, it is to be appreciated that the geometrical configuration defined by the valve seat 52 may be any geometrical configuration suitable to permit exhaust gas to flow out of the wastegate channel 46. As shown in FIG. 4, the geometrical configuration of the valve seat 52 has a plane P extending across the channel outlet 50. In other words, the plane P extends across the channel outlet 50 and is defined within the valve seat 52. As shown in FIGS. 5 and 7, the plane P has a pulse region 56. The pulse region 56 is a region in which exhaust gas pulses in the wastegate channel 46 are found. The pulse region 56 has a pulse centroid 58 and a pulse axis PA extending perpendicular to the plane P and through the pulse centroid 58. Typically, the pulse axis PA is disposed between a first axis A1 of a first valve shaft 110 and a second axis A2 of a second valve shaft 114 with respect to the plane P such that a pulse force from the exhaust gas at the pulse region 56 is disposed between the first and second valve shafts 110, 114 with respect to the plane P during operation of the turbocharger 30, as shown in FIG. 6. The plane P has a geometric centroid 60.

The pulse region 56 may be from 1 to 99%, 10 to 90%, 20 to 80%, 30 to 70%, 40 to 60%, 40 to 80%, 5 to 15%, or 8 to 12% of a total area of the plane P of the geometrical configuration defined by the valve seat 52. It is to be appreciated that the total area of the plane P of the geometrical configuration representing the pulse region 56 may vary depending on various factors, such as the engine and turbocharger configuration, shape of a combustion chamber, design of a fuel injection strategy, aerodynamic shape of intake manifolds, aerodynamic shape of the turbine housing, logic and strategy programmed into an engine control unit, throttle position, RPM of the internal combustion engine, RPM of the turbine wheel of the turbocharger, ambient conditions (pressure and temperature), and power taken from a shaft of the turbocharger to run other accessories, to name a few.

Although not required, the pulse region 56 typically has a similar shape as the geometrical configuration defined by the valve seat 52. For example, as shown in FIG. 5, when the geometrical configuration defined by the valve seat 52 is circular, the pulse region 56 may be circular. However, it is so be appreciated that the pulse region 56 may have a shape that is different from the geometrical configuration defined by the valve seat 52. In certain embodiments, the pulse region 56 is circular or semicircular.

With reference to FIGS. 8-13, the wastegate channel 46 may be further defined as a first wastegate channel 62. Moreover, the wastegate channel inlet 48 and the wastegate channel outlet 50 may further be defined as a first wastegate channel inlet 64 and a first wastegate channel outlet 66.

With continued reference to FIGS. 8-13, the wastegate duct 44 may further define a second wastegate channel 68 in communication with the turbine housing inlet 38 for discharging exhaust gas from the turbine housing inlet 38 by bypassing the turbine housing interior 36. Typically, the first and second wastegate channels 62, 68, are separated by a wall 70. It is to be appreciated that exhaust gas which flows through the second wastegate channel 68 may completely bypass the turbine housing interior 36 such that exhaust gas flows directly from the turbine housing inlet 38 to the turbine housing outlet 40 via the second wastegate channel 68. Alternatively, exhaust gas may flow in the turbine housing interior 36 prior to entering the second wastegate channel 68 from the turbine housing inlet 38.

The second wastegate channel 68 typically includes a second wastegate channel inlet 72 and a second wastegate channel outlet 74. In the illustrated embodiment, the second wastegate channel inlet 72 is in fluid communication with the turbine housing inlet 38 and the second wastegate channel outlet 74 is in fluid communication with the turbine housing outlet 40. However, it is to be appreciated that the second wastegate channel outlet 74 may be in fluid communication with the environment outside of the turbine housing 32. In other words, exhaust gas may flow through the second wastegate channel outlet 74 and be discharged to the environment outside of the turbine housing 32 without first flowing through the turbine housing outlet 40.

Figure 8:
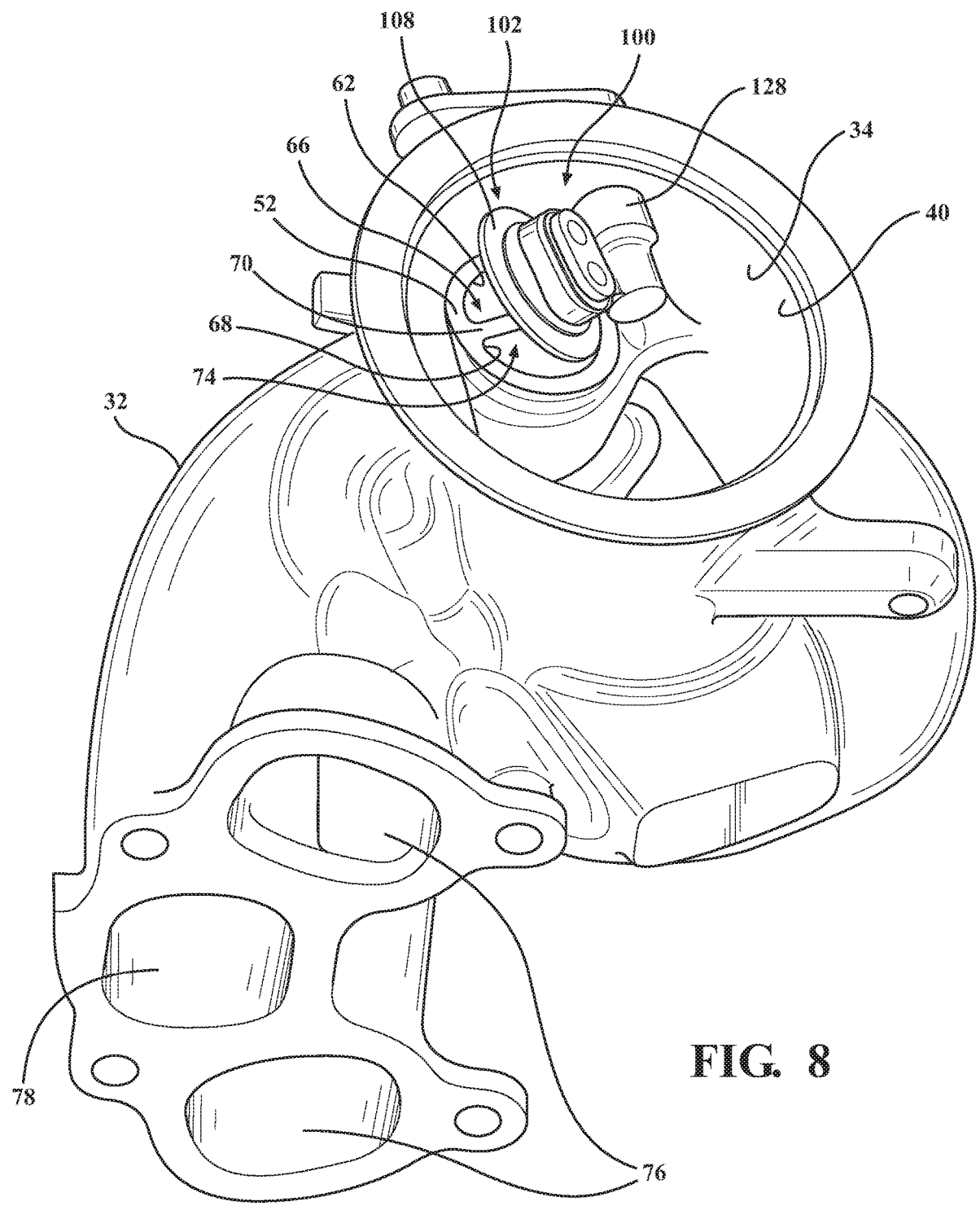
FIG. 8 is an isometric view of a turbine housing, a valve seat, and a wastegate assembly according to another embodiment, with a valve element of the wastegate assembly having a first valve shaft and a second valve shaft, and with the valve element of the wastegate assembly shown disengaged with the valve seat.
Figure 9:
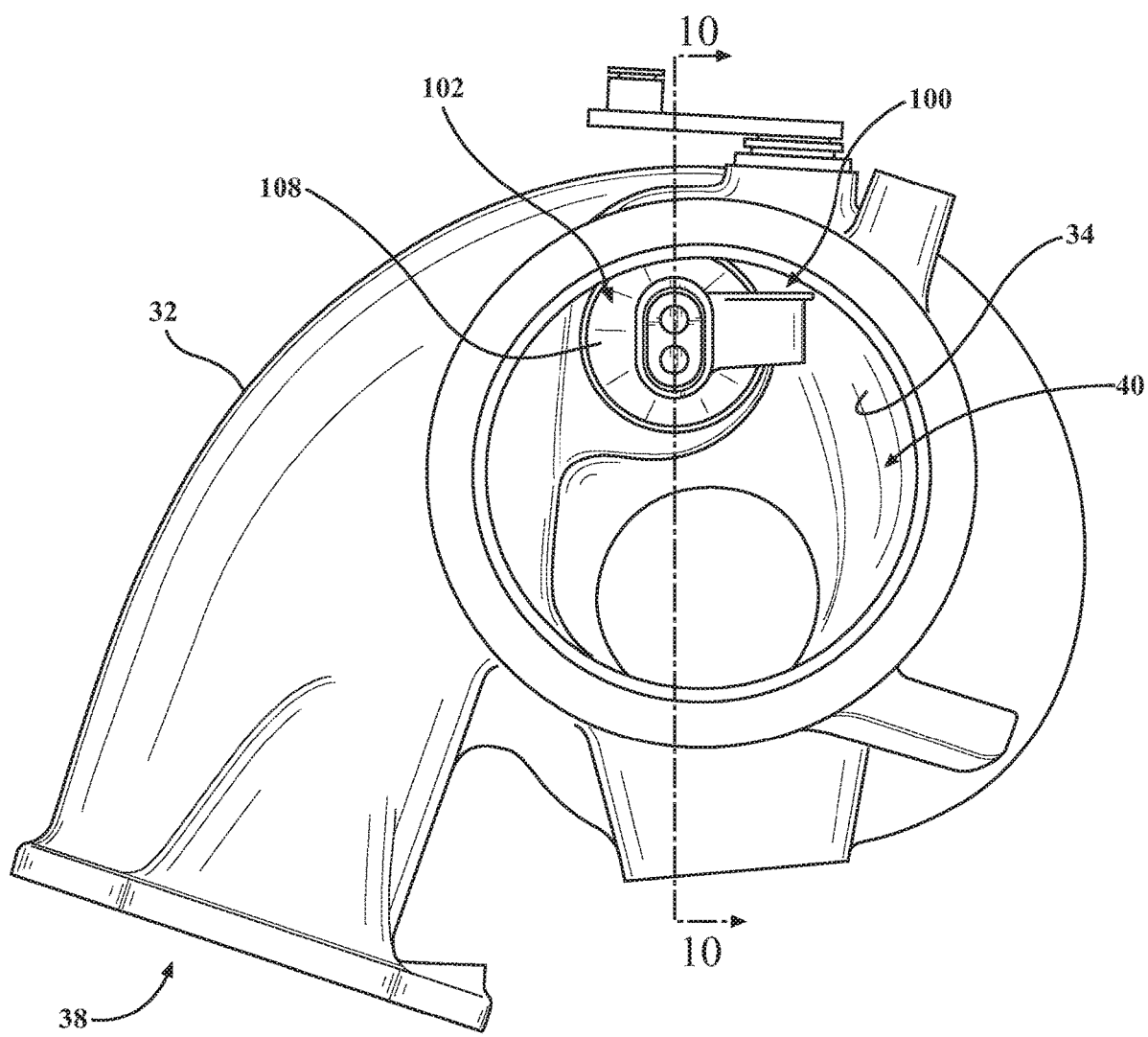
FIG. 9 is a top view of the turbine housing, the valve seat, and the wastegate assembly of FIG. 8, with the valve element of the wastegate assembly shown engaged with the valve seat.

With reference to FIG. 8, when the first and second wastegate channels 62, 68 are present, the turbine housing inlet 38 may further be defined as a first volute inlet 76 and a second volute inlet 78 for delivering exhaust gas from the internal combustion engine to the turbine housing interior 36. When the first and second volute inlets 76, 78 are present, the first volute inlet 76 is in fluid communication with the first wastegate channel 62 and the second volute inlet 78 is in fluid communication with the second wastegate channel 68. Although not required, the second volute inlet 78 may be bifurcated as shown in FIG. 8. It is to be appreciated that the first volute inlet 76 may be bifurcated, or that neither of the first and second volute inlets 76, 78 may be bifurcated.

With reference again to FIG. 4, the turbocharger 30 also includes a wastegate assembly 100 for controlling exhaust gas flow to the turbine housing interior 36. The wastegate assembly 100 includes a valve element 102, a valve arm 104, and a washer 106. For this disclosure, it is to be appreciated that the wastegate assembly 100 controlling exhaust gas flow to the turbine housing interior 36 necessarily includes controlling the exhaust gas to bypass the turbine housing interior 36. In other words, the wastegate assembly 100 controls exhaust gas flow by either directing the exhaust gas to flow through the turbine housing interior 36 or to bypass the turbine housing interior 36. In view of this, depending on the position of the valve element 102 (closed and open positions described in further detail below), the wastegate assembly 100 controls the flow of exhaust to the turbine housing interior 36 or to bypass the turbine housing interior 36.

The valve element 102 is engageable with the valve seat 52. The valve element 102 has a valve body 108. Although not required, the valve body 108 is typically circular as shown in FIG. 2.

With reference to FIG. 4, the valve element 102 also has a first valve shaft 110 extending away from the valve body 108 along a first axis A1. The valve element further has a second valve shaft 114 spaced from the first valve shaft 110 and extending away from the valve body 108 along a second axis A2. The first and second valve shafts 110, 114 may have a cylindrical configuration. However, it is to be appreciated that the first and second valve shafts 110, 114 may have any suitable configuration.

The first and second valve shafts 110, 114 may be the same as each other or different from each other. Although not required, typically the first and second valve shafts 110, 114 are the same as each other. For example, as shown in FIG. 4, typically the first and second valve shafts 110, 114 each have cylindrical configurations.

Although not required, typically the first and second valve shafts 110, 114 are integral with the valve body 108 as shown in FIG. 4. However, it is to be appreciated that the first and second valve shafts 110, 114 may not be integral with the valve body 108 and instead may be coupled to the valve body 108.

It is to be further appreciated that the valve element 102 may further have any number of additional valve shafts and that the description applicable to the first and second valve shafts 110, 114 is applicable to any additional valve shaft. For example, the valve element 102 may have three, four, five, or six valve shafts. However, it is to be appreciated that the valve element 102 may have more than six shafts.

The valve element 102 is movable between a first position (e.g., closed position) and a second position (e.g., open position). As best shown in FIGS. 3, 4, 9, and 10, when the valve element 102 is in the first position, the valve element 102 is engaged with the valve seat 52 for preventing exhaust gas flow from the turbine housing inlet 38 from bypassing the turbine housing interior 36. In other words, when the valve element 102 is in the first position, exhaust gas flows through the turbine housing inlet 38 and through the wastegate channel 46, or when present the first and/or second wastegate channels 62, 68, included in the turbine housing 32 where it is prevented from bypassing the turbine housing interior 36 by the valve body 108 of the valve element 102. Accordingly, when the valve element 102 is in the first position, exhaust gas received by the turbine housing inlet 38 from the internal combustion engine must necessarily flow through the turbine housing interior 36 before being discharged from the turbine housing 32 via the turbine housing outlet 40.

As best shown in FIGS. 2 and 8, when the valve element 102 is in the second position, the valve body 108 is disengaged with the valve seat 52 for allowing exhaust gas flow from the turbine housing inlet 38 to bypass the turbine housing interior 36. In other words, when the valve element 102 is in the second position, exhaust gas flows through turbine housing inlet 38, through the wastegate channel, or when present the first and/or second wastegate channels 62, 68 included in the turbine housing 32, and out of the first or second wastegate channel outlets 62, 68 where it is discharged from the turbine housing 32 without flowing the turbine housing interior 36. Accordingly, when the valve element 102 is in the second position, exhaust gas received by the turbine housing inlet 38 from the internal combustion engine may flow through either the turbine housing interior 36 or the first and/or second wastegate channels 62, 68 included in the turbine housing 32 before being discharged from the turbine housing 32.

Figure 10:
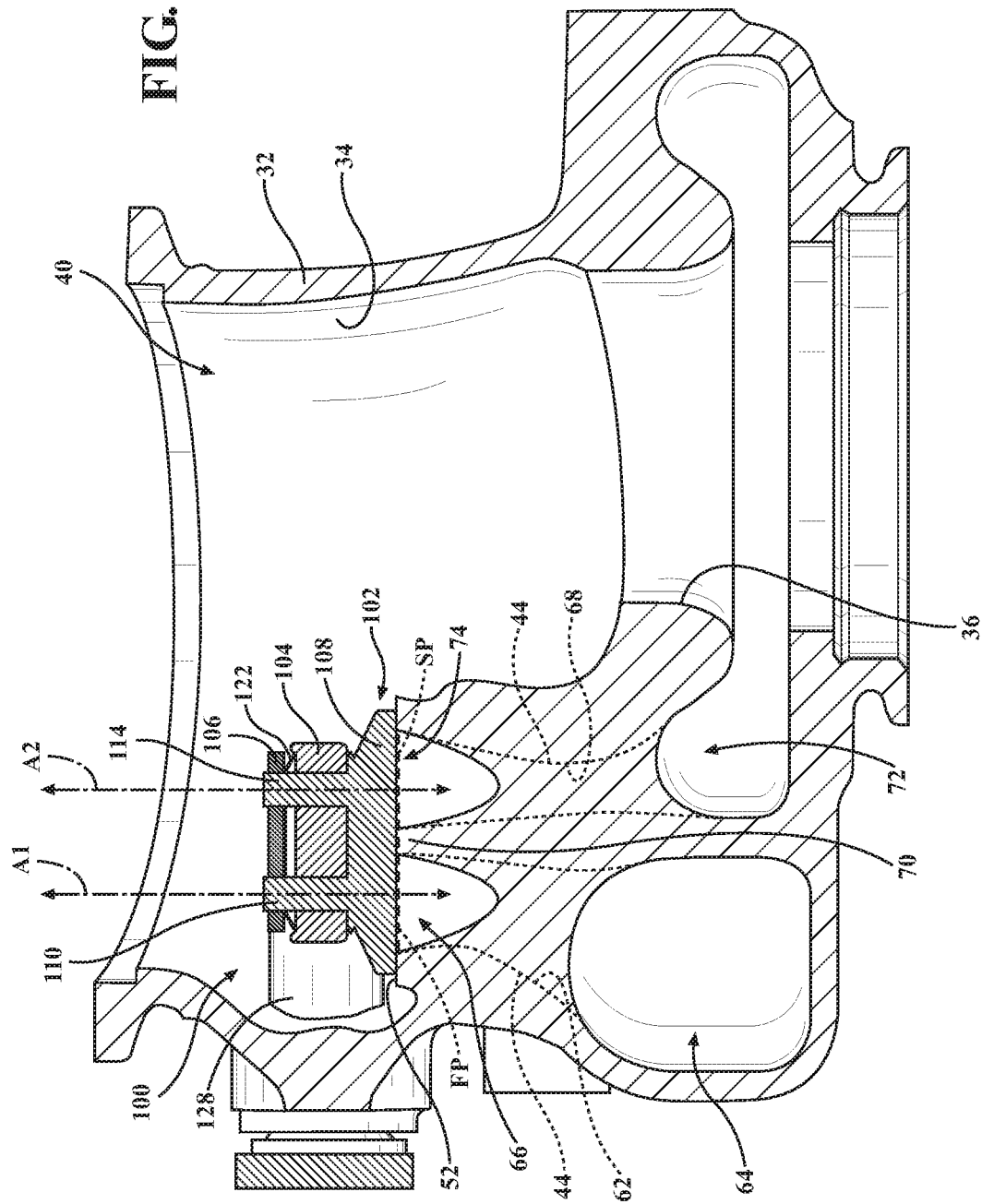
FIG. 10 is a cross-sectional view of the turbine housing, the valve seat, and the wastegate assembly of FIG. 8 taken along line 10-10 in FIG. 9.

With reference to FIGS. 4 and 10, the valve arm 104 is coupled to the first and second valve shafts 110, 114 for moving the valve element 102 between the first and second positions. It is to be appreciated that the valve arm 104 of the wastegate assembly 100 may be further defined as two or more valve arms. The valve arm 104 may be coupled to the first and second valve shafts 110, 114 in any manner suitable for allowing the valve arm to move the valve element 102 between the first and second positions. For example, in the illustrated embodiment, the valve arm defines two apertures configured to receive the first and second valve shafts 110, 114 of the valve element 102.

The washer 106 is coupled to at least one of the first and second valve shafts 110, 114 of the valve element 102. The washer 106 is axially spaced from the valve arm 104 with respect to the first and second axis A1, A2 such that the valve arm 104 is disposed between the washer 106 and the valve body 108. In this manner, the washer 106 retains the valve arm 104 to the at least one of the first and second valve shafts 110, 114 that the washer 106 is coupled to.

As shown in FIG. 4, in some embodiments, the washer 106 is coupled to the first and second valve shafts 110, 114 of the valve element 102. However, it is to be appreciated that the washer 106 may be coupled to only the first valve shaft 110, or only the second valve shaft 114.

In some embodiments, as shown in FIGS. 14, 15, 17, 21, and 22, the washer 106 is further defined as a first washer 118 coupled to the first valve shaft 110 and axially spaced from the valve arm 104 with respect to the first axis A1 for retaining the valve arm 104 to the first valve shaft 110. When the first washer 118 is coupled the first valve shaft 110, the wastegate assembly 100 may include a second washer 120 coupled to the second valve shaft 114 and axially spaced from the valve arm 104 with respect to the second axis A2 for retaining the valve arm 104 to the second valve shaft 114.

The first and second washers 118, 120 included in the wastegate assembly 100 may be coupled to the first and/or second valve shafts in any suitable manner such as welding.

It is to be further appreciated that the wastegate assembly 100 may further include any number of additional washers corresponding to the number of valve shafts included in the valve element, and that the description applicable to the first and second washers 118, 120 is applicable to any additional washer. For example, if there are three valve shafts included in the valve element 102, the wastegate assembly may include three washers. However, it is to be appreciated that the wastegate assembly 100 may include more than three washers.

With reference to FIG. 4, the wastegate assembly 100 may further include a biasing member 122. When present, the biasing member 122 is disposed about at least one of the first and second valve shafts 110, 114 between the valve arm 104 and the washer 106. In the illustrated embodiment, the biasing member 122 is disposed about the first and second valve shafts 110, 114.

As the valve element 102 is moved between the first and second positions, the valve arm 104 may move axially with respect to the first and second axis A1, A2 until the valve arm 104 directly contacts the washer 106. Over time, this results in wear of the washer 106 and, ultimately, failure of the washer 106. When the biasing member 122 is present, the biasing member 122 reduces direct contact between the valve arm 104 and the washer 106, thereby reducing wear of the washer 106 and increasing lifetime of the wastegate assembly 100. Moreover, the biasing member 122 reduces vibrations of the valve arm 104 that occur during operation of the turbocharger 30, thereby improving the NVH (noise, vibration, and harshness) characteristics of the turbocharger 30, particularly when the turbocharger 30 is used in automotive vehicle applications.

Typically, the biasing member 122 is chosen from a cupped spring, a curved spring, a Belleville spring, a dogbone spring, a wave spring, an octopus spring, a coil spring, a hair spring, a torsion bar, and an air spring. However, it is to be appreciated that the biasing member 122 may be any biasing member 122 suitable for reducing direct contact of the valve arm 104 and the washer 106.

Figure 15:
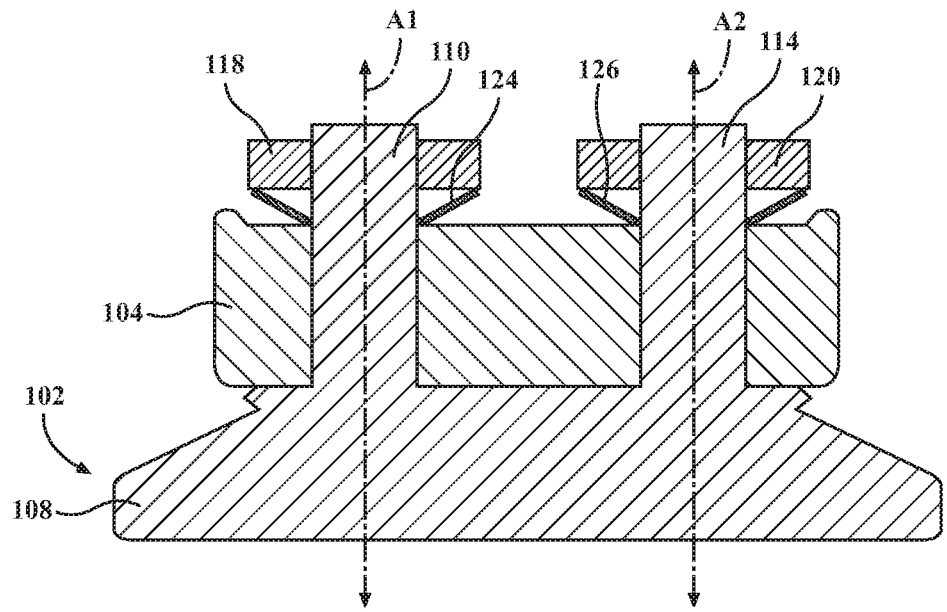
FIG. 15 is a cross-sectional view of a wastegate assembly according to another embodiment, with the wastegate assembly including a first washer, a second washer, a first biasing member, and a second biasing member.
Figure 16:
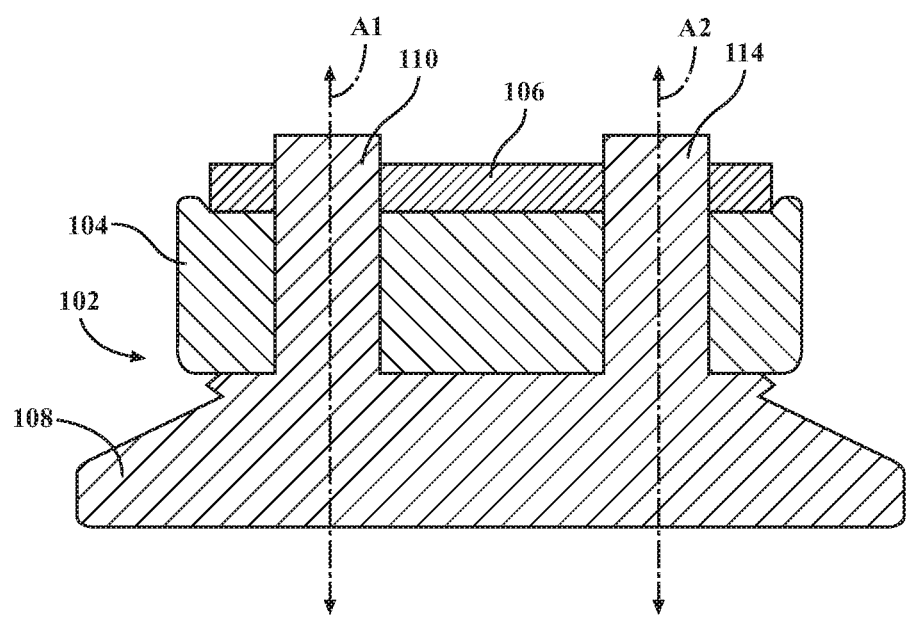
FIG. 16 is a cross-sectional view of a wastegate assembly according to another embodiment, with the wastegate assembly being free of any biasing member and including a washer.
Figure 21:
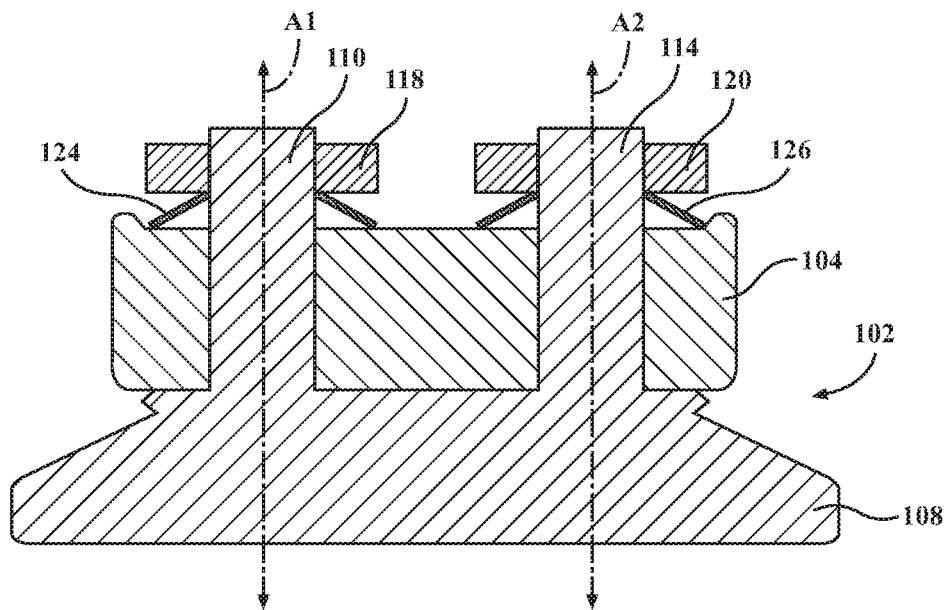
FIG. 21 is a cross-sectional view of a wastegate assembly according to another embodiment, with the wastegate assembly including a first and second washer and a first and second biasing member.
Figure 23:
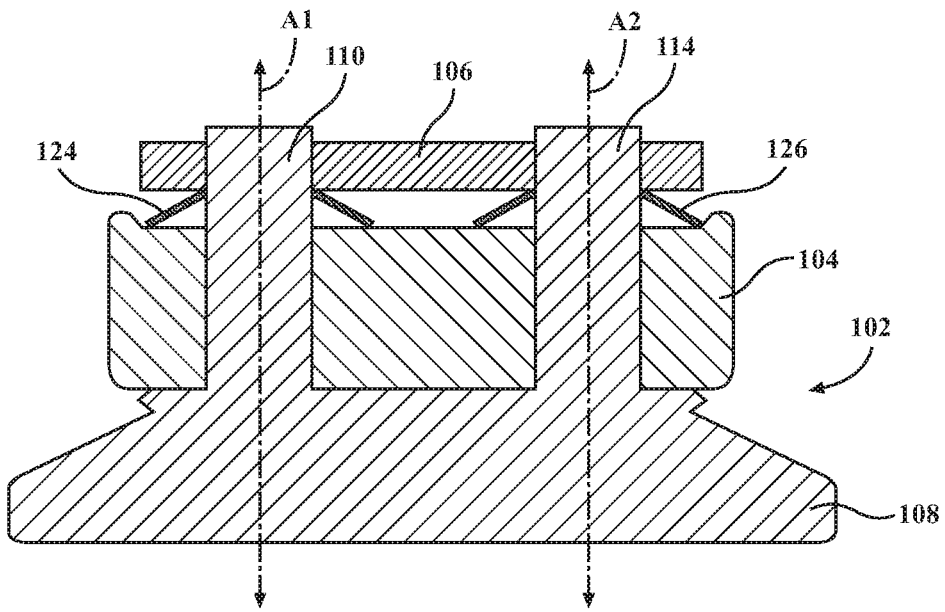
FIG. 23 is a cross-sectional view of a wastegate assembly according to another embodiment, with the wastegate assembly including a first and second biasing member and a single washer.
Figure 24:
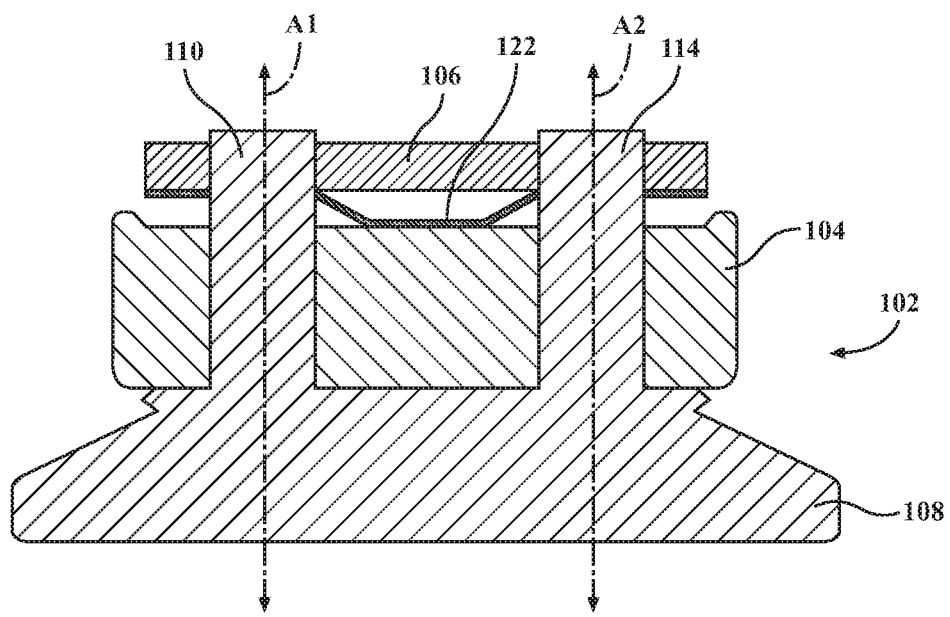
FIG. 24 is a cross-sectional view of a wastegate assembly according to another embodiment, with the wastegate assembly including a biasing member and a washer.

In some embodiments, as shown in FIGS. 15, 21, and 23, the biasing member 122 is further defined as a first biasing member 124 disposed about the first valve shaft 110 between the valve arm 104 and the washer 106 for reducing wear of the washer 106. With continued reference to FIGS. 15 and 21, the wastegate assembly 100 may further include a second biasing member 126 disposed about the second valve shaft 114 between the valve arm 104 and the washer 106 for reducing wear of the washer 106.

When the wastegate assembly 100 includes the second biasing member 126, the second biasing member 126 is typically chosen from is chosen from a cupped spring, a curved spring, a Belleville spring, a dogbone spring, a wave spring, an octopus spring, a coil spring, a hair spring, a torsion bar, and an air spring. Moreover, the second biasing member 126 may be the same as the first biasing member 124 or different from the first biasing member 124.

In other embodiments, when the wastegate assembly 100 includes the first washer 118 coupled to the first valve shaft 110 and the second washer 120 coupled to the second valve shaft 114, as shown in FIG. 23, the first biasing member 124 may be disposed about the first valve shaft 110 between the valve arm 104 and the washer 106 for reducing wear of the first washer 118. The wastegate assembly may also include the second washer 120 disposed about the second valve shaft 114 between the valve arm 104 and the second washer 120 for reducing wear to the second washer 120.

Figure 22:
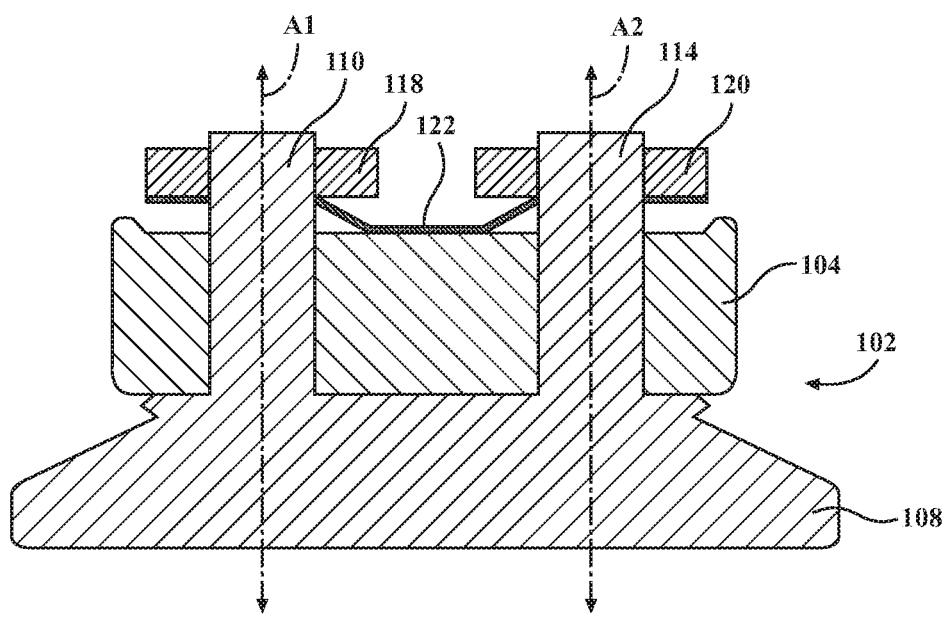
FIG. 22 is a cross-sectional view of a wastegate assembly according to another embodiment, with the wastegate assembly including a biasing member and a first and second washer.

With reference to FIG. 22, when the wastegate assembly 100 includes the first washer 118 coupled to the first valve shaft 110 and the second washer 120 coupled to the second valve shaft 114, the biasing member 122 may be disposed about the first and second valve shafts 110, 114 between the valve arm 104 and the first and second washers 118, 120 for reducing wear of the first and second washers 118, 120.

It is to be further appreciated that the wastegate assembly 100 may further include any number of additional biasing members corresponding to the number of washers included in the wastegate assembly 100, and that the description applicable to the first and second biasing members 124, 126 is applicable to any additional biasing member. For example, if there are three washers included in the wastegate assembly 100, the wastegate assembly 100 may include three biasing members. However, it is to be appreciated that the wastegate assembly 100 may include more than three biasing members.

Figure 17:
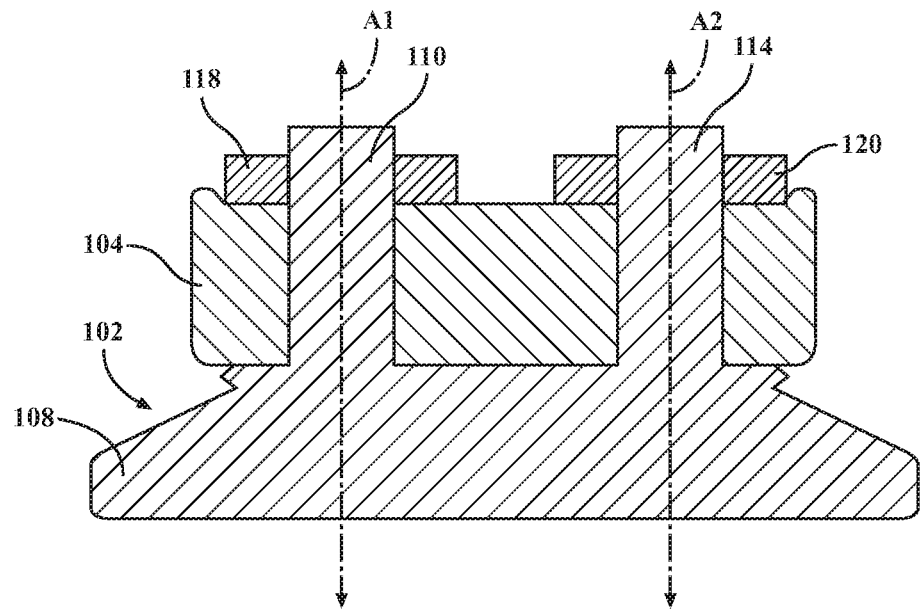
FIG. 17 is a cross-sectional view of a wastegate assembly according to another embodiment, with the wastegate assembly being free of any biasing member and including a first washer and a second washer.
Figure 18:
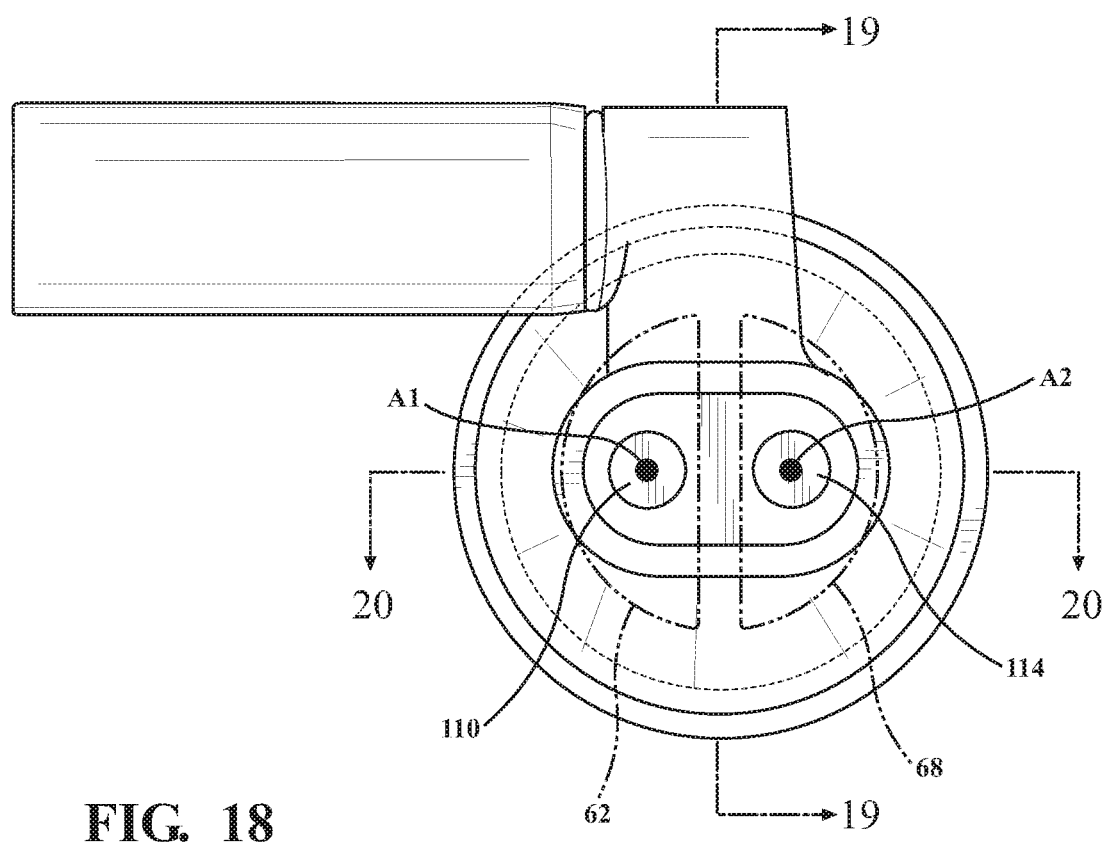
FIG. 18 is a top view of a wastegate assembly according to another embodiment, with the wastegate assembly free of any biasing member and including a washer.
Figure 19:
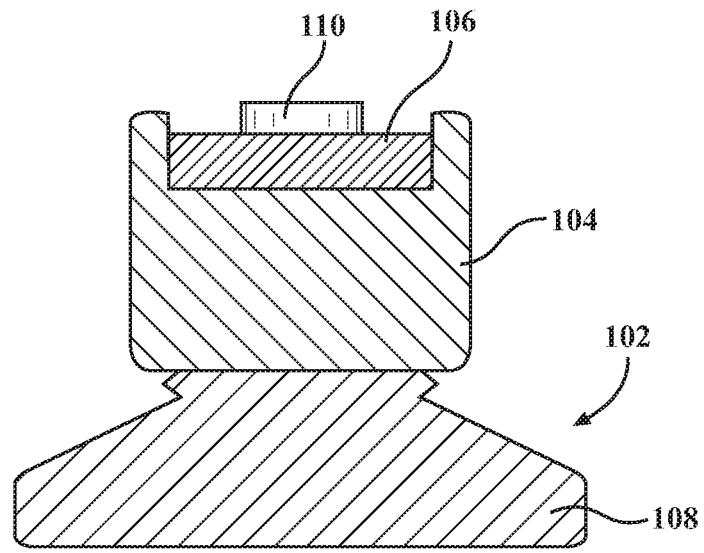
FIG. 19 is a cross-sectional view of the wastegate assembly of FIG. 18 taken along line 19-19.
Figure 20:
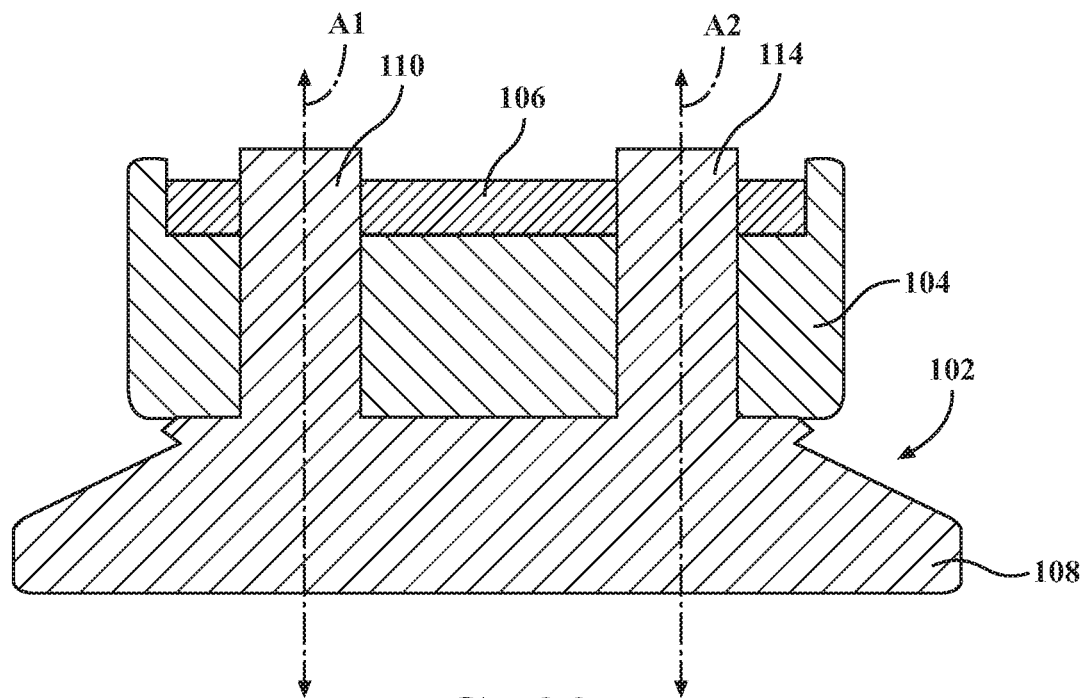
FIG. 20 is a cross-sectional view of the wastegate assembly of FIG. 18 taken along line 20-20.

With reference to FIGS. 16, 17, 19 and 20, in some embodiments, the wastegate assembly 100 may be free of any biasing member. As shown in FIGS. 19 and 20, when the wastegate assembly 100 is free of any biasing member, the wastegate assembly 100 may include the washer 106 coupled to the first and second valve shafts 110, 114. Alternatively, as shown in FIG. 17, when the wastegate assembly 100 is free of any biasing member, the wastegate assembly 100 may include the first washer 118 coupled to the first valve shaft 110 and the second washer 120 coupled to the second valve shaft 114.

As shown in FIG. 2, the valve arm 104 may be coupled to a spindle arm 128 that is rotatable about an axis or rotation for moving the valve arm 104, thereby moving the valve element 102 between the first and second positions. Although not required, in the illustrated embodiment the valve arm 104 is integral with the spindle arm 128. However, it is to be appreciated that the valve arm 104 may not be integral with the spindle arm 128 and instead may be coupled to the spindle arm 128. In some embodiments, the spindle arm 128 is disposed in a bore defined by the turbine housing 32 such that the spindle arm 128 extends between the turbine housing outlet 40 and the environment outside of the turbine housing 32.

Although not shown, the wastegate assembly 100 may further include an actuator. When present, the actuator is configured to move the valve element 102 between the first and second positions. For example, the actuator may be operably coupled to the spindle arm 128 to rotate the spindle arm 128, thereby moving the valve arm 104 to move the valve element 102 between the first and second position.

With reference again to FIG. 1, the turbocharger may further include the turbine wheel 42, a shaft 130, a compressor wheel 132. As described above, during operation of the turbocharger 30, the turbine wheel 42 receives exhaust gas from the internal combustion which causes the turbine wheel 42 to rotate. The shaft 130 is coupled to and rotatable by the turbine wheel 42. The shaft 130 extends along a shaft axis SA. The compressor wheel 132 is coupled to the shaft 130 and is rotatable by the shaft 130 for delivering compressed air to the internal combustion engine. The bearing housing 136 extends along the shaft axis SA between the turbine wheel 42 and the compressor wheel 132.

The turbocharger 30 may further include a bearing housing 136 that extends along the shaft axis SA between the turbine wheel 42 and the compressor wheel 132. When present, the bearing housing 136 defines a bearing housing interior 138 and is disposed about the shaft 130 such that the shaft 130 is disposed at least partially in the bearing housing interior 138.

The turbocharger 30 may also include a compressor housing 140 defining a compressor housing interior 142. When the compressor housing 140 is present, the compressor wheel 132 may be disposed in the compressor housing 140.

As shown in FIG. 10, the first axis A1 of the first valve shaft 110 may extend through the channel outlet 66 of the first wastegate channel 62 when the valve element 102 is in the first position such that the first valve shaft 110 is disposed over the channel outlet 66 of the first wastegate channel 62, and the second axis A2 of the second valve shaft 114 may extend through the channel outlet 74 of the second wastegate channel 68 when the valve element 102 is in the first position such that the second valve shaft 114 is disposed over the channel outlet 74 of the second wastegate channel 68.

With reference to FIGS. 8 and 10, when the turbine housing 32 includes the first and second wastegate channels 62, 68, the valve seat 52 is disposed about the first and second wastegate channels 62, 68 at the respective first and second wastegate channel outlets 66, 74. In such embodiments, the valve seat 52 may define a first geometrical configuration having a first plane FP extending across the channel outlet 50 at the first wastegate channel 62, with the first plane FP having a first geometric centroid 82 at the channel outlet 50 of the first wastegate channel 62, and a second geometrical configuration having a second plane SP extending across the channel outlet 50 at the second wastegate channel 68, with the second plane SP having a second geometric centroid 86 at the channel outlet 50 of the second wastegate channel 68, as shown in FIG. 11.

Figure 11:
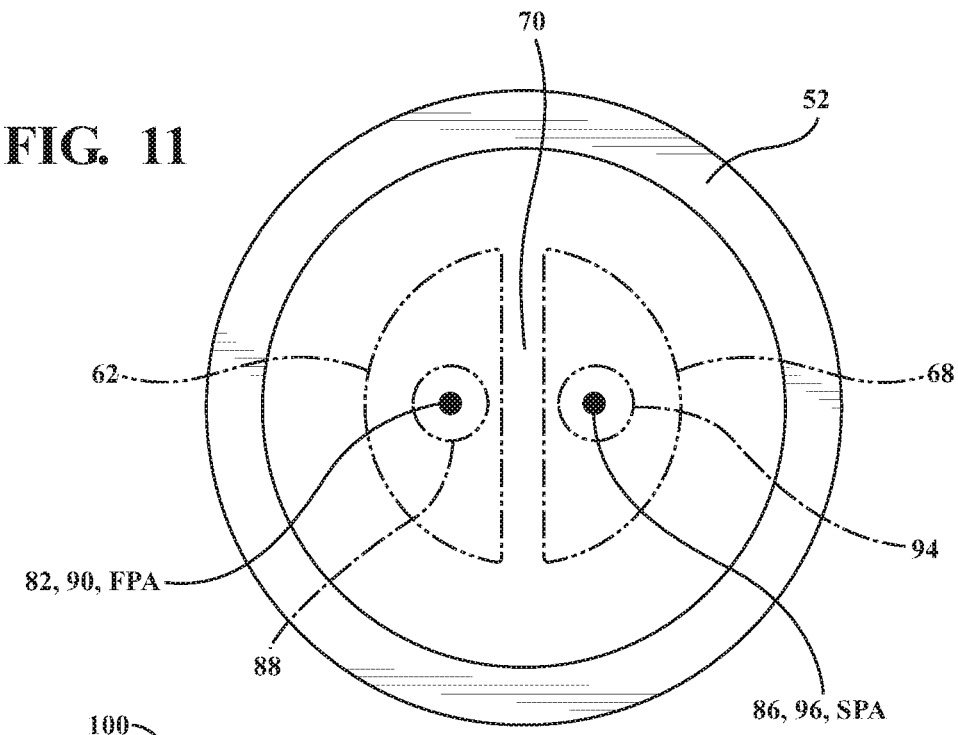
FIG. 11 is a top view of the valve seat of FIG. 8 showing a first and second pulse region, a first and second geometrical centroid, and a first and second pulse centroid, with the first geometrical centroid and the first pulse centroid being aligned with one another, and with the second geometrical centroid and the second pulse centroid being aligned with one another.
Figure 12:
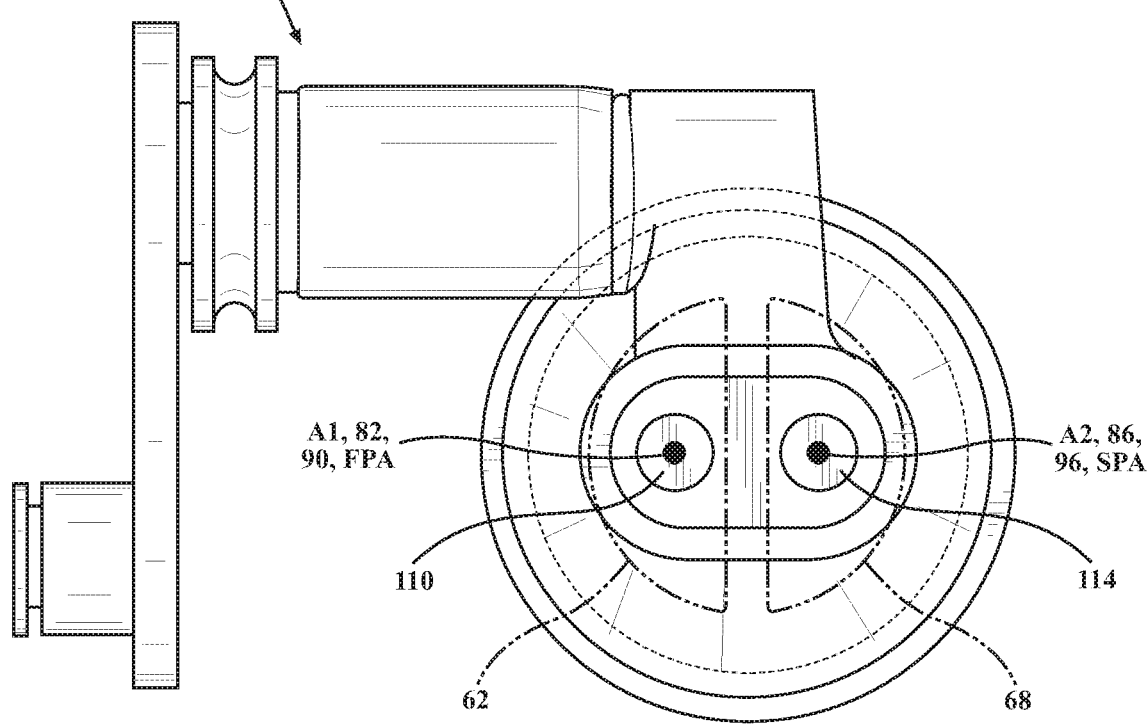
FIG. 12 is a top view of the wastegate assembly and the valve seat of FIG. 8, with the valve element shown engaged with the valve seat, and with the valve seat shown in phantom.

With reference to FIG. 12, the first axis A1 of the first valve shaft 110 may extend through the first geometric centroid 82 when the valve element 102 is in the first position such that the first valve shaft 110 is disposed over the first geometric centroid 82, and the second axis A2 of the second valve shaft 114 may extend through the second geometric centroid 86 when the valve element 102 is in the first position such that the second valve shaft 114 is disposed over the second geometric centroid 86. The first and second geometrical configurations defined by the valve seat 52 may be the same as each other or different from each other. As shown in FIG. 11, the first and second geometrical configurations defined by the valve seat 52 are typically semicircular. However, it is to be appreciated that the first and second geometrical configurations defined by the valve seat 52 may each be any geometrical configuration suitable to permit exhaust gas to flow out of the first and second wastegate channels 62, 68.

As shown in FIG. 11, the first plane FP may have a first pulse region 88, with the first pulse region 88 having a first pulse centroid 90 and a first pulse axis FPA extending perpendicular to said first plane FP and through said first pulse centroid 90. The second plane SP may have a second pulse region 94, with the second pulse region 94 having a second pulse centroid 96 and a second pulse axis SPA extending perpendicular to the second plane SP and through the second pulse centroid 96. In such embodiments, the first axis A1 of the first valve shaft 110 may extend through the first pulse region 88 when the valve element 102 is in the first position such that the first valve shaft 110 is disposed over the first pulse region 88, and the second axis A2 of the second valve shaft 114 may extend through the second pulse region 94 when the valve element 102 is in the first position such that the second valve shaft 114 is disposed over the second pulse region 94.

Typically, the first pulse region 88 is from 1 to 99%, 10 to 90%, 20 to 80%, 30 to 70%, 40 to 60%, 40 to 80%, 5 to 15%, or 8 to 12% of a total area of the first plane FP of the geometrical configuration. It is to be appreciated that the total area of the first plane FP of the geometrical configuration representing the first pulse region 58 may vary depending on various factors, such as the engine and turbocharger configuration, shape of a combustion chamber, design of a fuel injection strategy, aerodynamic shape of intake manifolds, aerodynamic shape of the turbine housing, logic and strategy programmed into an engine control unit, throttle position, RPM of the internal combustion engine, RPM of the turbine wheel of the turbocharger, ambient conditions (pressure and temperature), and power taken from a shaft of the turbocharger to run other accessories, to name a few. Typically, the second pulse region 94 is from 1 to 99%, 10 to 90%, 20 to 80%, 30 to 70%, 40 to 60%, 40 to 80%, 5 to 15%, or 8 to 12% of a total area of the second plane SP. It is to be appreciated that the total area of the second plane SP of the geometrical configuration representing the second pulse region 94 may vary depending on various factors, such as the engine and turbocharger configuration, shape of a combustion chamber, design of a fuel injection strategy, aerodynamic shape of intake manifolds, aerodynamic shape of the turbine housing, logic and strategy programmed into an engine control unit, throttle position, RPM of the internal combustion engine, RPM of the turbine wheel of the turbocharger, ambient conditions (pressure and temperature), and power taken from a shaft of the turbocharger to run other accessories, to name a few.

Although not required, the first and second pulse regions 90, 96 typically have a similar shape as the respective first and second geometrical configurations of the first and second planes FP, SP. For example, when the first and second planes FP, SP are semicircular, the respective first and second pulse regions 90, 96 may be semicircular. However, it is so be appreciated that the first and second pulse regions 90, 96 may have a shape that is different from the first and second geometrical configurations defined by the valve seat 52. In certain embodiments, the first and second pulse regions 90, 96 are circular or semicircular.

As described above, when the internal combustion engine includes the first and second groups of cylinders, the first and second groups of cylinders produce exhaust gas in alternating pulses. The pulses of exhaust gas flow through the first or second wastegate channels 62, 68 included in the turbine housing 32 via the turbine housing inlet 38. The pulses of exhaust gas then exit the first or second wastegate channels 62, 68 included in the turbine housing 32 at the respective first or second wastegate channel outlets 66, 68. Because the first and second pulse regions 90, 96, are centered at the respective first and second centroids 66, 68, forces generated from the pulses of exhaust gas are highest in magnitude within the first and second pulse regions 90, 96. Further, by centering the first and second pulse regions 90, 96 at the respective first and second centroids 66, 68, moments generated by the pulses are minimized, which, in turn, reduces "valve rocking" of the valve element 102 and overall wear on the wastegate assembly 100.

In another embodiment, the turbocharger 30 includes the turbine housing 32. The turbine housing 32 includes the interior surface 34 defining the turbine housing interior 36, with the interior surface 34 extending the turbine housing inlet 38 defined at one end of the interior surface 34 and in fluid communication with the internal combustion engine and the turbine housing interior 36 for delivering exhaust gas from the internal combustion engine to the turbine housing interior 36, and the turbine housing outlet 40 defined at the opposite end of the interior surface 34 and in fluid communication with the turbine housing interior 36 for discharging exhaust gas from the turbine housing interior 36. The turbine housing 32 also includes the wastegate duct 44 disposed downstream of the turbine housing inlet 38 and defining the wastegate channel 46 in fluid communication with the turbine housing inlet 38 for discharging exhaust gas from the turbine housing inlet 38 by bypassing the turbine housing interior 36. The turbocharger 30 also includes the valve seat 52 disposed about the wastegate channel 46 at the channel outlet 50 of the wastegate channel 46. The valve seat 52 has a geometrical configuration having a plane P extending across the channel outlet 50, with the plane P having the geometric centroid 60 and the pulse region 56. The pulse region 56 has the pulse centroid 58 and the pulse axis PA extending perpendicular to the plane P and through the pulse region 56. The turbocharger 30 further includes the wastegate assembly 100 for controlling exhaust gas flow to the turbine housing interior 36. The wastegate assembly 100 includes the valve element 102 engageable with the valve seat 52. The valve element 102 has the valve body 108, the first valve shaft 110 extending away from the valve body 108 along the first axis A1, and the second valve shaft 114 spaced from the first valve shaft 110 and extending away from the valve body 108 along the second axis A2. The valve element 102 is moveable between the first position where the valve body 108 is engaged with the valve seat 52 for preventing exhaust gas flow from the turbine housing inlet 38 from bypassing the turbine housing interior 36, and the second position where the valve body 108 is disengaged with the valve seat 52 for allowing exhaust gas flow from the turbine housing inlet 38 to bypass the turbine housing interior 36. The wastegate assembly 100 also includes a valve arm 104 coupled to the first and second valve shafts 110, 114 of the valve element 102 for moving the valve element 102 between the first and second positions. The wastegate assembly 100 further includes the washer 106 coupled to at least one of the first and second valve shafts 110, 114 of the valve element 102 and axially spaced from the valve arm 104 with respect to the first and second axis A1, A2 for retaining the valve arm 104 to the at least one of the first and second valve shafts 110, 114. The pulse axis PA is disposed between the first axis A1 of the first valve shaft 110 and the second axis A2 of the second valve shaft 114 with respect to the plane P when the valve element 102 is in the first position such that the pulse force from the exhaust gas at the pulse region 56 is disposed between the first and second valve shafts 110, 114 with respect to the plane P during operation of the turbocharger 30.

Having the pulse axis PA disposed between the first axis A1 of the first valve shaft 110 and the second axis A2 of the second valve shaft 114 with respect to the plane P when the valve element 102 is in the first position allows forces from the pulses of exhaust gas to be distributed between the first and second valve shafts 110, 114. This distribution of forces exerted by the pulses of exhaust gas reduces wear of the first and second valve shafts 110, 114 and the washer 106, increases the efficiency of the turbocharger 30, and increases lifetime of the turbocharger 30.

As shown in FIG. 6, the pulse axis PA may be equidistant from the first axis A1 of the first valve shaft 110 and the second axis A2 of the second valve shaft 114. Having the pulse axis PA equidistant from the first axis A1 of the first valve shaft 110 and the second axis A2 of the second valve shaft 114 allows the pulse force to be equally distributed between the first and second valve shafts 110, 114, which helps reduce wear on the wastegate assembly 100.

The pulse axis PA may be configured to be aligned with the geometric centroid 60 when the valve element 102 is in the first position. Having the pulse axis PA configured to be aligned with the geometric centroid 60 when the valve element 102 is in the first position allows the pulse force to be equally distributed between the first and second valve shafts 110, 114, which helps reduce wear on the wastegate assembly 100. Specifically, because the pulse force is equally distributed between the first and second valve shafts 110, 114, a moment arm of the valve element 102 is eliminated, which in turn reduces, if not eliminates, any rocking of the valve element 102. Reducing, if not eliminating, rocking (rocking torque) of the valve element 102 increases the useful life of the wastegate assembly 100 and reduces noise, vibration, and harshness (NVH).

In another embodiment, the turbocharger 30 includes the turbine housing 32. The turbine housing 32 includes the interior surface 34 defining the turbine housing interior 36. The interior surface 34 extends between the turbine housing inlet 38 defined at one end of the interior surface 34 and in fluid communication with the internal combustion engine and the turbine housing interior 36 for delivering exhaust gas from the internal combustion engine to the turbine housing interior 36, and the turbine housing outlet 40 defined at the opposite end of the interior surface 34 and in fluid communication with the turbine housing interior 36 for discharging exhaust gas from the turbine housing interior 36.

The turbine housing 32 includes a wastegate duct 44 disposed downstream of the turbine housing inlet 38 and defining the first wastegate channel 62 and the second wastegate channel 68 in fluid communication with the turbine housing inlet 38 for discharging exhaust gas from the turbine housing inlet 38 by bypassing the turbine housing interior 36. The turbocharger 30 also includes the valve seat 52 disposed about the first and second wastegate channels 62, 68 at the channel outlet 50 of the first and second wastegate channels 62, 68. The valve seat 52 has the first geometrical configuration having the first plane FP extending across the channel outlet 50 of the first wastegate channel 62. The valve seat 52 has the second geometrical configuration having the second plane SP extending across the channel outlet 50 of the second wastegate channel 68. The first plane FP has the first geometric centroid 82 and the first pulse region 88. The first pulse region 88 has the first pulse centroid 90 and the first pulse axis FPA extending perpendicular to the first plane FP and through the first pulse centroid 90. The second plane SP has the second geometric centroid 86 and the second pulse region 94. The second pulse region 94 has the second pulse centroid 96 and the second pulse axis SPA extending perpendicular to the second plane SP and through the second pulse centroid 96. The turbocharger 30 has the wastegate assembly 100 for controlling exhaust gas flow to the turbine housing interior 36. The wastegate assembly 100 includes the valve element 102 engageable with the valve seat 52. The valve element 102 has the valve body 108, the first valve shaft 110 extending away from the valve body 108 along the first axis A1, and the second valve shaft 114 spaced from the first valve shaft 110 and extending away from the valve body 108 along the second axis A2. The valve element 102 is moveable between the first position where the valve body 108 is engaged with the valve seat 52 for preventing exhaust gas flow from the turbine housing inlet 38 from bypassing the turbine housing interior 36, and the second position where the valve body 108 is disengaged with the valve seat 52 for allowing exhaust gas flow from the turbine housing inlet 38 to bypass the turbine housing interior 36. The wastegate assembly 100 also includes the valve arm 104 coupled to the first and second valve shafts 110, 114 of the valve element 102 for moving the valve element 102 between the first and second positions. The wastegate assembly 100 further includes the washer 106 coupled to at least one of the first and second valve shafts 110, 114 of the valve element 102 and axially spaced from the valve arm 104 with respect to the first and second axis A1, A2 for retaining the valve arm 104 to the at least one of the first and second valve shafts 110, 114. The first axis A1 of the first valve shaft 110 extends through the first pulse region 88 when the valve element 102 is in the first position such that the first valve shaft 110 is disposed over the first pulse region, and the second axis A2 of the second valve shaft 114 extends through the second pulse region 94 when the valve element 102 is in the first position such that the second valve shaft 114 is disposed over the second pulse region 94.

Having the first axis A1 of the first valve shaft 110 extend through the first pulse region 88 when the valve element 102 is in the first position, and the second axis A2 of the second valve shaft 114 extend through the second pulse region 94 when the valve element 102 is in the first position allows the force from the pulses of the exhaust gas to be distributed over the first valve shaft 110 and the second valve shaft 114, respectively. Having the pulses of the exhaust gas distributed over the first valve shaft 110 and the second valve shaft 114 reduces a rocking motion, and reduces the intensity of the rocking motion, of the valve element 102. As a result, forces generated from the pulses of exhaust gas produced by the internal combustion engine are highest in magnitude within the first and second pulse regions 90, 96, and this compressive load is applied to the first and second valve shafts 110, 114, rather than to other components of the wastegate assembly 100. Because the first and second valve shafts 110, 114 are disposed over either the first and second wastegate channel outlets 66, 74, the first and second pulse regions 90, 96, forces exerted on the valve body 108 by the pulses of exhaust gas when the valve element 102 is in the first position are distributed over both of the first and second valve shafts 110, 114. This distribution of forces exerted by the pulses of exhaust gas reduces wear of the first and second valve shafts 110, 114 and the washer 106, increases the efficiency of the turbocharger 30, and increases lifetime of the turbocharger 30. Even further, because the pulse force is distributed over the first and second valve shafts 110, 114, a moment arm of the valve element 102 is eliminated, which in turn reduces, if not eliminates, any rocking of the valve element 102. Reducing, if not eliminating, rocking (rocking torque) of the valve element 102 increases the useful life of the wastegate assembly 100 and reduces noise, vibration, and harshness (NVH).

The first axis A1 of the first valve shaft 110 may extend through the first geometric centroid 82 when the valve element 102 is in the first position such that the first valve shaft 110 is disposed over the first geometric centroid 82, and the second axis A2 of the second valve shaft 114 extends through the second geometric centroid 86 when the valve element 102 is in the first position such that the second valve shaft 114 is disposed over the second geometric centroid 86, as shown in FIG. 12.

Figure 13:
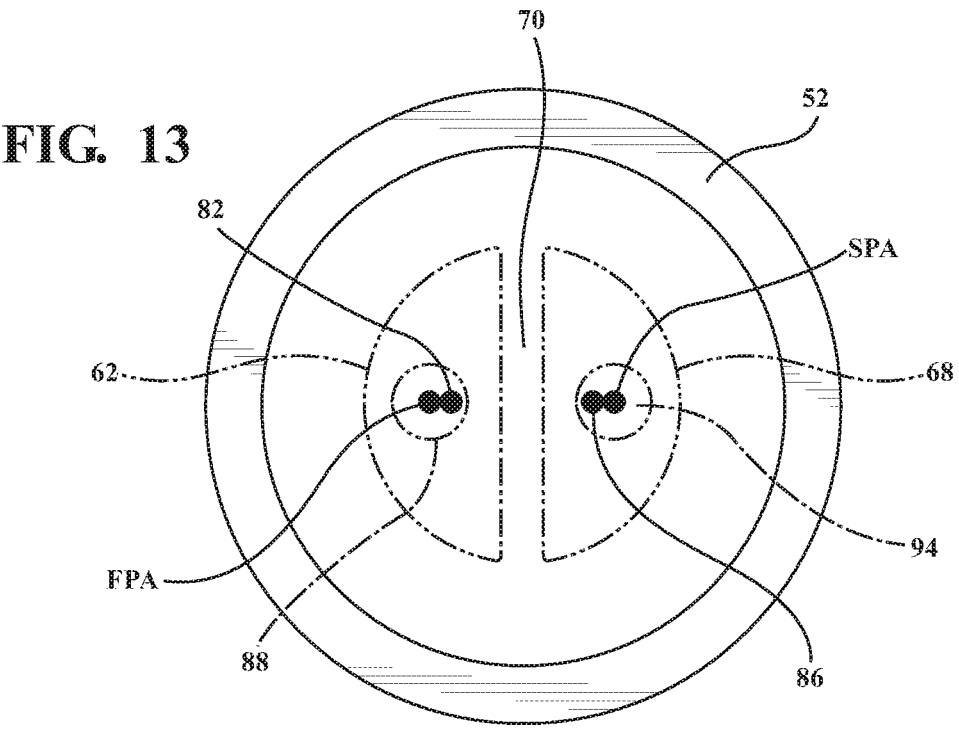
FIG. 13 is a top view of the wastegate assembly and the valve seat of FIG. 8, with the first geometric centroid and the first pulse centroid offset from one another, and with the second geometric centroid and the second pulse centroid offset from one another.
Figure 14:
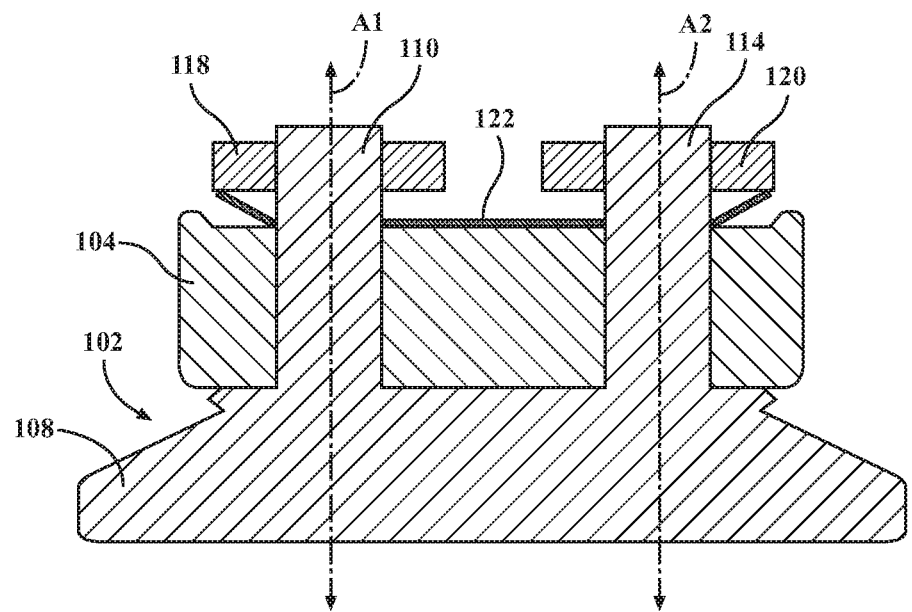
FIG. 14 is a cross-sectional view of a wastegate assembly according to another embodiment, with the wastegate assembly including a first washer, a second washer, and a biasing member.

The first axis A1 of the first valve shaft 110 may be configured to be aligned with the first pulse axis FPA when the valve element 102 is in the first position, and the second axis A2 of the second valve shaft 114 may be configured to be aligned with the second pulse axis SPA when the valve element 102 is in the first position, as shown in FIG. 12. However, it is to be appreciated that the first pulse axis FPA and the first geometric centroid 82 may be offset from one another, and that the second pulse axis SPA and the second geometric centroid 86 may be offset from one another, as shown in FIG. 13. When the first axis A1 of the first valve shaft 110 is configured to be aligned with the first pulse axis FPA when the valve element 102 is in the first position, and when the second axis A2 of the second valve shaft 114 is configured to be aligned with the second pulse axis SPA when the valve element 102 is in the first position allows the first and second valve shafts 110, 114, respectively, to absorb the energy caused by the pulses of exhaust gas, which increases the life of the wastegate assembly 100 and, specifically, of the valve element 102. Additionally, NVH of the wastegate assembly 100 is reduced.

The washer 106 may be an anti-rotation washer, as shown in FIGS. 19 and 20. Having the washer 106 being an anti-rotation washer helps prevent further movement between the washer 106 and the valve arm 104.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A turbocharger for receiving an exhaust gas from an internal combustion engine and for delivering compressed air to the internal combustion engine, said turbocharger comprising:
a turbine housing comprising:
an interior surface defining a turbine housing interior, said interior surface extending between:
a turbine housing inlet defined at one end of said interior surface and in fluid communication with the internal combustion engine and said turbine housing interior for delivering the exhaust gas from the internal combustion engine to said turbine housing interior, and
a turbine housing outlet defined at an opposite end of said interior surface and in fluid communication with said turbine housing interior for discharging the exhaust gas from said turbine housing interior, and
a wastegate duct disposed downstream of said turbine housing inlet and defining a wastegate channel in fluid communication with said turbine housing inlet for discharging the exhaust gas from said turbine housing inlet by bypassing said turbine housing interior;
a valve seat disposed about said wastegate channel at a channel outlet of said wastegate channel; and
a wastegate assembly for controlling exhaust gas flow to said turbine housing interior, said wastegate assembly comprising,
a valve element engageable with said valve seat, with said valve element having a valve body, a first valve shaft extending away from said valve body along a first axis, and a second valve shaft spaced from said first valve shaft and extending away from said valve body along a second axis, with said valve element moveable between a first position where said valve body is engaged with said valve seat for preventing exhaust gas flow from said turbine housing inlet from bypassing said turbine housing interior, and a second position where said valve body is disengaged with said valve seat for allowing exhaust gas flow from said turbine housing inlet to bypass said turbine housing interior,
a valve arm coupled to said first and said second valve shafts of said valve element for moving said valve element between said first and said second positions,
a washer coupled to at least one of said first and said second valve shafts of said valve element and axially spaced from said valve arm with respect to said first and said second axes for retaining said valve arm to said at least one of said first and said second valve shafts, and
a biasing member disposed about at least one of said first and said second valve shafts between said valve arm and said washer for reducing wear of said washer;
wherein said biasing member is in direct contact with said valve arm; and
wherein said wastegate channel is further defined as a first wastegate channel, wherein said wastegate duct further defines a second wastegate channel in fluid communication with said turbine housing inlet for discharging the exhaust gas from said turbine housing inlet by bypassing said turbine housing interior, and wherein said valve seat is disposed about said first and said second wastegate channels at respective channel outlets of said first and said second wastegate channels.

2. The turbocharger as set forth in claim 1, wherein said washer is further defined as a first washer coupled to said first valve shaft of said valve element and axially spaced from said valve arm with respect to said first axis for retaining said valve arm to said first valve shaft, wherein said biasing member is further defined as a first biasing member disposed about said first valve shaft between said valve arm and said first washer for reducing wear of said first washer, and wherein said wastegate assembly further comprises,
a second washer coupled to said second valve shaft of said valve element and axially spaced from said valve arm with respect to said second axis for retaining said valve arm to said second valve shaft, and
a second biasing member disposed about said second valve shaft between said valve arm and said second washer for reducing wear of said second washer.

3. The turbocharger as set forth in claim 1, wherein said biasing member is chosen from a cupped spring, a curved spring, Belleville spring, a dogbone spring, a wave spring, an octopus spring, a coil spring, a hair spring, a torsion bar, and an air spring.

4. The turbocharger as set forth in claim 1, wherein said first axis of said first valve shaft extends through said channel outlet of said first wastegate channel when said valve element is in said first position such that said first valve shaft is disposed over said channel outlet of said first wastegate channel, and wherein said second axis of said second valve shaft extends through said channel outlet of said second wastegate channel when said valve element is in said first position such that said second valve shaft is disposed over said channel outlet of said second wastegate channel.

5. The turbocharger as set forth in claim 4, wherein said valve seat defines,
a first geometrical configuration having a first plane extending across said channel outlet at said first wastegate channel, with said first plane having a first geometric centroid at said channel outlet of said first wastegate channel, and
a second geometrical configuration having a second plane extending across said channel outlet at said second wastegate channel, with said second plane having a second geometric centroid at said channel outlet of said second wastegate channel.

6. The turbocharger as set forth in claim 5, wherein said first axis of said first valve shaft extends through said first geometric centroid when said valve element is in said first position such that said first valve shaft is disposed over said first geometric centroid, and wherein said second axis of said second valve shaft extends through said second geometric centroid when said valve element is in said first position such that said second valve shaft is disposed over said second geometric centroid.

7. The turbocharger as set forth in claim 6, wherein said first plane has a first pulse region, with said first pulse region having a first pulse centroid and a first pulse axis extending perpendicular to said first plane and through said first pulse centroid, wherein said second plane has a second pulse region, and with said second pulse region having a second pulse centroid and a second pulse axis extending perpendicular to said second plane and through said second pulse centroid, and wherein said first axis of said first valve shaft extends through said first pulse region when said valve element is in said first position such that said first valve shaft is disposed over said first pulse region, and wherein said second axis of said second valve shaft extends through said second pulse region when said valve element is in said first position such that said second valve shaft is disposed over said second pulse region.

8. The turbocharger as set forth in claim 7, wherein said first axis of said first valve shaft is configured to be aligned with said first pulse axis when said valve element is in said first position, and wherein said second axis of said second valve shaft is configured to be aligned with said second pulse axis when said valve element is in said first position.

9. The turbocharger as set forth in claim 8, wherein said first pulse axis is configured to extend through said first geometric centroid during operation of the turbocharger, and wherein said second pulse axis is configured to extend through said second geometrical centroid during operation of the turbocharger.

10. The turbocharger as set forth in claim 1, wherein said turbine housing inlet is further defined as a first volute inlet and a second volute inlet for delivering the exhaust gas from the internal combustion engine to said turbine housing interior, wherein said first wastegate channel is in fluid communication with said first volute inlet, and wherein said second wastegate channel is in fluid communication with said second volute inlet.

11. A wastegate assembly for controlling flow of exhaust gas to a turbine housing interior of a turbocharger, said wastegate assembly comprising:
    a valve element having a valve body, a first valve shaft extending away from said valve body along a first axis, and a second valve shaft spaced from said first valve shaft and extending away from said valve body along a second axis, with said valve element moveable between a first position and a second position to control flow of exhaust gas to the turbine housing interior of the turbocharger;
    a valve arm coupled to said first and said second valve shafts of said valve element for moving said valve element between said first and said second positions;
    a washer coupled to said first and said second valve shafts of said valve element and axially spaced from said valve arm with respect to said first and said second axes for retaining said valve arm to said at least one of said first and said second valve shafts; and
    a biasing member disposed about at least one of said first and said second valve shafts between said valve arm and said washer for reducing wear of said washer;
    wherein said biasing member is in direct contact with said valve arm.

12. A turbocharger for receiving exhaust gas from an internal combustion engine and for delivering compressed air to the internal combustion engine, said turbocharger comprising:
    a turbine housing comprising:
        an interior surface defining a turbine housing interior, said interior surface extending between:
            a turbine housing inlet defined at one end of said interior surface and in fluid communication with the internal combustion engine and said turbine housing interior for delivering exhaust gas from the internal combustion engine to said turbine housing interior, and
            a turbine housing outlet defined at an opposite end of said interior surface and in fluid communication with said turbine housing interior for discharging exhaust gas from said turbine housing interior, and
        a wastegate duct disposed downstream of said turbine housing inlet and defining a first wastegate channel and a second wastegate channel in fluid communication with said turbine housing inlet for discharging exhaust gas from said turbine housing inlet by bypassing said turbine housing interior;
    a valve seat disposed about said first and said second wastegate channels at a channel outlet of said first and said second wastegate channels, with said valve seat having a first geometrical configuration having a first plane extending across said channel outlet of said first wastegate channel, with said valve seat having a second geometrical configuration having a second plane extending across said channel outlet of said second wastegate channel, with said first plane having a first geometric centroid and a first pulse region, with said first pulse region having a first pulse centroid and a first pulse axis extending perpendicular to said first plane and through said first pulse centroid, with said second plane having a second geometric centroid and a second pulse region, and with said second pulse region having a second pulse centroid and a second pulse axis extending perpendicular to said second plane and through said second pulse centroid; and
    a wastegate assembly for controlling exhaust gas flow to said turbine housing interior, said wastegate assembly comprising,
        a valve element engageable with said valve seat, with said valve element having a valve body, a first valve shaft extending away from said valve body along a first axis, and a second valve shaft spaced from said first valve shaft and extending away from said valve body along a second axis, with said valve element moveable between a first position where said valve body is engaged with said valve seat for preventing exhaust gas flow from said turbine housing inlet from bypassing said turbine housing interior, and a second position where said valve body is disengaged with said valve seat for allowing exhaust gas flow from said turbine housing inlet to bypass said turbine housing interior,
        a valve arm coupled to said first and said second valve shafts of said valve element for moving said valve element between said first and said second positions, and
        a washer coupled to at least one of said first and said second valve shafts of said valve element and axially spaced from said valve arm with respect to said first and said second axes for retaining said valve arm to said at least one of said first and said second valve shafts;
    wherein said first axis of said first valve shaft extends through said first pulse region when said valve element is in said first position such that said first valve shaft is disposed over said first pulse region, and wherein said second axis of said second valve shaft extends through said second pulse region when said valve element is in said first position such that said second valve shaft is disposed over said second pulse region.

13. The turbocharger as set forth in claim 12, wherein said first axis of said first valve shaft extends through said first geometric centroid when said valve element is in said first position such that said first valve shaft is disposed over said first geometric centroid, and wherein said second axis of said second valve shaft extends through said second geometric centroid when said valve element is in said first position such that said second valve shaft is disposed over said second geometric centroid.

14. The turbocharger as set forth in claim 12, wherein said first axis of said first valve shaft is configured to be aligned with said first pulse axis when said valve element is in said first position, and wherein said second axis of said second valve shaft is configured to be aligned with said second pulse axis when said valve element is in said first position.

15. The turbocharger as set forth in claim 12, wherein said first pulse axis is configured to extend through said first geometric centroid during operation of the turbocharger, and wherein said second pulse axis is configured to extend through said second geometrical centroid during operation of the turbocharger.

16. The turbocharger as set forth in claim 12, wherein said turbine housing inlet is further defined as a first volute inlet and a second volute inlet for delivering exhaust gas from the internal combustion engine to said turbine housing interior, wherein said first wastegate channel is in fluid communication with said first volute inlet, and wherein said second wastegate channel is in fluid communication with said second volute inlet.

17. The turbocharger as set forth in claim 12, wherein said washer is an anti-rotation washer.

18. A turbocharger for receiving an exhaust gas from an internal combustion engine and for delivering compressed air to the internal combustion engine, said turbocharger comprising:
  a turbine housing comprising:
    an interior surface defining a turbine housing interior, said interior surface extending between:
      a turbine housing inlet defined at one end of said interior surface and in fluid communication with the internal combustion engine and said turbine housing interior for delivering the exhaust gas from the internal combustion engine to said turbine housing interior, and
      a turbine housing outlet defined at an opposite end of said interior surface and in fluid communication with said turbine housing interior for discharging the exhaust gas from said turbine housing interior, and
    a wastegate duct disposed downstream of said turbine housing inlet and defining a wastegate channel in fluid communication with said turbine housing inlet for discharging the exhaust gas from said turbine housing inlet by bypassing said turbine housing interior;
  a valve seat disposed about said wastegate channel at a channel outlet of said wastegate channel; and
  a wastegate assembly for controlling exhaust gas flow to said turbine housing interior, said wastegate assembly comprising,
    a valve element engageable with said valve seat, with said valve element having a valve body, a first valve shaft extending away from said valve body along a first axis, and a second valve shaft spaced from said first valve shaft and extending away from said valve body along a second axis, with said valve element moveable between a first position where said valve body is engaged with said valve seat for preventing exhaust gas flow from said turbine housing inlet from bypassing said turbine housing interior, and a second position where said valve body is disengaged with said valve seat for allowing exhaust gas flow from said turbine housing inlet to bypass said turbine housing interior,
    a valve arm coupled to said first and said second valve shafts of said valve element for moving said valve element between said first and said second positions,
    a washer coupled to at least one of said first and said second valve shafts of said valve element and axially spaced from said valve arm with respect to said first and said second axes for retaining said valve arm to said at least one of said first and said second valve shafts, and
    a biasing member disposed about at least one of said first and said second valve shafts between said valve arm and said washer for reducing wear of said washer;
  wherein said wastegate channel is further defined as a first wastegate channel, wherein said wastegate duct further defines a second wastegate channel in fluid communication with said turbine housing inlet for discharging the exhaust gas from said turbine housing inlet by bypassing said turbine housing interior, and wherein said valve seat is disposed about said first and said second wastegate channels at respective channel outlets of said first and said second wastegate channels; and
  wherein said first axis of said first valve shaft extends through said channel outlet of said first wastegate channel when said valve element is in said first position such that said first valve shaft is disposed over said channel outlet of said first wastegate channel, and wherein said second axis of said second valve shaft extends through said channel outlet of said second wastegate channel when said valve element is in said first position such that said second valve shaft is disposed over said channel outlet of said second wastegate channel.

19. The turbocharger as set forth in claim 18, wherein said valve seat defines,
  a first geometrical configuration having a first plane extending across said channel outlet at said first wastegate channel, with said first plane having a first geometric centroid at said channel outlet of said first wastegate channel, and
  a second geometrical configuration having a second plane extending across said channel outlet at said second wastegate channel, with said second plane having a second geometric centroid at said channel outlet of said second wastegate channel.

20. The turbocharger as set forth in claim 19, wherein said first axis of said first valve shaft extends through said first geometric centroid when said valve element is in said first position such that said first valve shaft is disposed over said first geometric centroid, and wherein said second axis of said second valve shaft extends through said second geometric centroid when said valve element is in said first position such that said second valve shaft is disposed over said second geometric centroid.

* * * * *